(12) United States Patent
Yabuno et al.

(10) Patent No.: US 7,149,177 B2
(45) Date of Patent: Dec. 12, 2006

(54) INFORMATION RECORDING MEDIUM, INFORMATION RECORDING APPARATUS, INFORMATION RECORDING METHOD, INFORMATION REPRODUCTION APPARATUS AND INFORMATION REPRODUCTION METHOD

(75) Inventors: Hiroyuki Yabuno, Osaka (JP); Yoshihisa Fukushima, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 854 days.

(21) Appl. No.: 10/275,462

(22) PCT Filed: Jul. 9, 2001

(86) PCT No.: PCT/JP01/05953

§ 371 (c)(1),
(2), (4) Date: Nov. 6, 2002

(87) PCT Pub. No.: WO02/05277

PCT Pub. Date: Jan. 17, 2002

(65) Prior Publication Data

US 2003/0154388 A1   Aug. 14, 2003

(30) Foreign Application Priority Data

Jul. 11, 2000 (JP) .............................. 2000-209975

(51) Int. Cl.
*G11B 7/24* (2006.01)
(52) U.S. Cl. .............................. 369/275.3; 369/53.21; 369/47.21
(58) Field of Classification Search ............. 369/275.3, 369/47.1, 59.22, 59.25, 47.19, 47.21, 47.22, 369/53.21

See application file for complete search history.

(56) References Cited

U.S. PATENT DOCUMENTS

| 5,901,127 A | * | 5/1999 | Sako et al. ............... 369/59.24 |
| 5,930,367 A | | 7/1999 | Osawa et al. ................. 380/49 |
| 6,005,839 A | | 12/1999 | Sako et al. |

FOREIGN PATENT DOCUMENTS

| EP | 0 902 426 A1 | 3/1999 |
| WO | 98/08180 | 2/1998 |
| WO | 00/62293 | 10/2000 |

* cited by examiner

*Primary Examiner*—Nabil Hindi
(74) *Attorney, Agent, or Firm*—Renner, Otto, Boisselle & Sklar, LLP

(57) ABSTRACT

An information recording medium includes a plurality of modulated data areas for recording a plurality of modulated codes; and a plurality of SYNC code areas for recording a plurality of SYNC codes. Data other than the plurality of modulated codes is recorded in at least one of the plurality of SYNC code areas in the form of at least one SYNC code.

10 Claims, 18 Drawing Sheets

FIG. 13

| SYNC code | Modulated code | SYNC code | Modulated code |
|---|---|---|---|
| SY0 | 1st frame | SY1 | 2nd frame |
| SY1 | 3rd frame | SY1 | 4th frame |
| SY1 | 5th frame | SY1 | 6th frame |
| SY1 | 7th frame | SY1 | 8th frame |
| SY1 | 9th frame | SY1 | 10th frame |
| SY1 | 11th frame | SY1 | 12th frame |
| SY1 | 13th frame | SY1 | 14th frame |
| SY1 | 15th frame | SY1 | 16th frame |
| SY1 | 17th frame | SY1 | 18th frame |
| SY1 | 19th frame | SY1 | 20th frame |
| SY1 | 21st frame | SY1 | 22nd frame |
| SY1 | 23rd frame | SY1 | 24th frame |
| SY1 | 25th frame | SY1 | 26th frame |

FIG. 14

| SYNC code | Modulated code | SYNC code | Modulated code |
|---|---|---|---|
| SY0 | 1st frame | SY5 | 2nd frame |
| SY1 | 3rd frame | SY5 | 4th frame |
| SY2 | 5th frame | SY5 | 6th frame |
| SY3 | 7th frame | SY5 | 8th frame |
| SY4 | 9th frame | SY5 | 10th frame |
| SY1 | 11th frame | SY6 | 12th frame |
| SY2 | 13th frame | SY6 | 14th frame |
| SY3 | 15th frame | SY6 | 16th frame |
| SY4 | 17th frame | SY6 | 18th frame |
| SY1 | 19th frame | SY7 | 20th frame |
| SY2 | 21st frame | SY7 | 22nd frame |
| SY3 | 23rd frame | SY7 | 24th frame |
| SY4 | 25th frame | SY7 | 26th frame |

FIG.15

| | SYNC code 1 | SYNC code 2 |
|---|---|---|
| SY0 | 0010010010000 10000000000010001 | 0001001000000 10000000000010001 |
| SY1 | 0000010000000 10000000000010001 | 0000010001000 10000000000010001 |
| SY2 | 0001000000000 10000000000010001 | 0001000001000 10000000000010001 |
| SY3 | 0000100000000 10000000000010001 | 0000100001000 10000000000010001 |
| SY4 | 0010000000000 10000000000010001 | 0010000001000 10000000000010001 |
| SY5 | 0010001001000 10000000000010001 | 0010001000000 10000000000010001 |
| SY6 | 0010010010000 10000000000010001 | 0010000010000 10000000000010001 |
| SY7 | 0010010001000 10000000000010001 | 0010010000000 10000000000010001 |

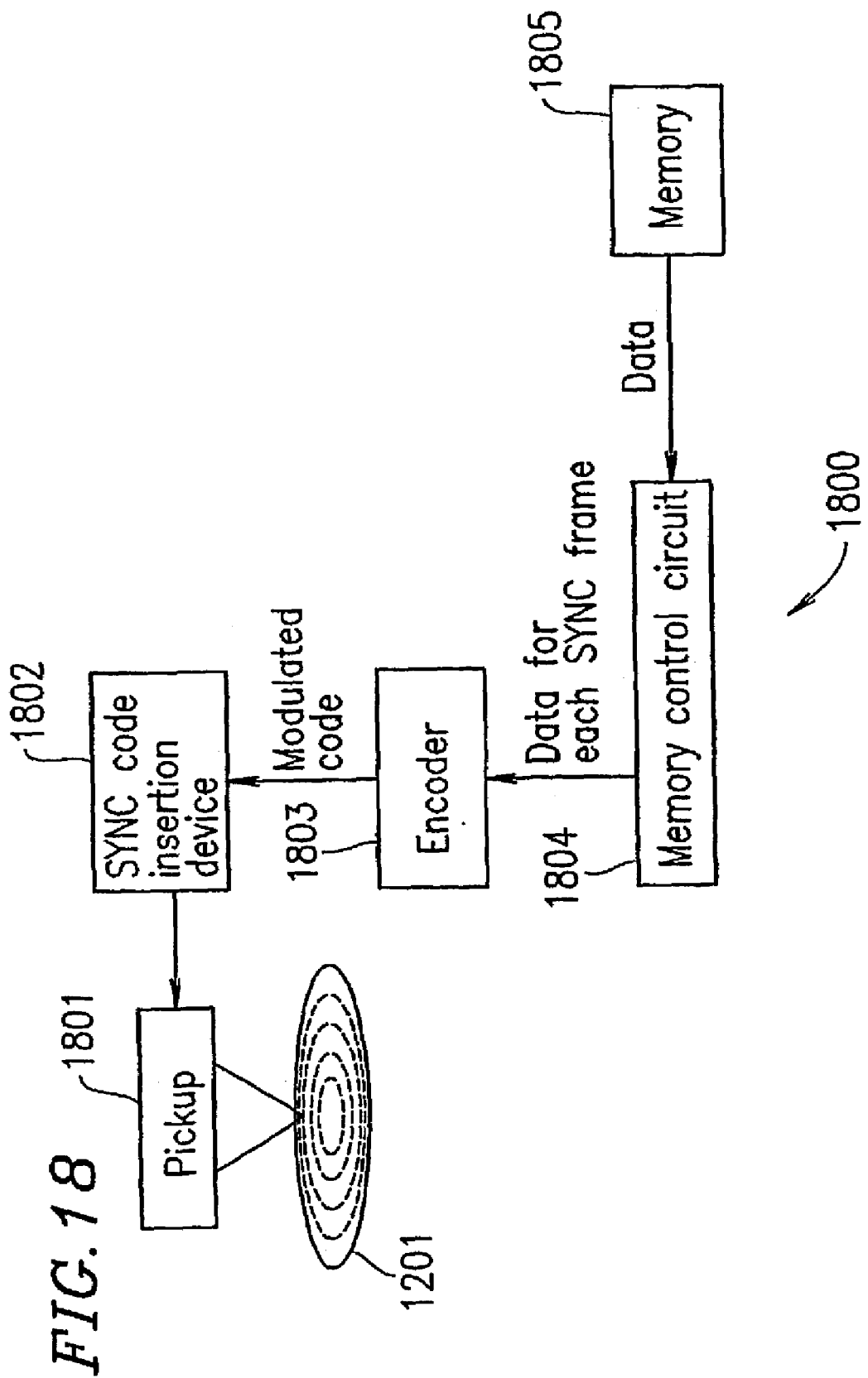

INFORMATION RECORDING MEDIUM, INFORMATION RECORDING APPARATUS, INFORMATION RECORDING METHOD, INFORMATION REPRODUCTION APPARATUS AND INFORMATION REPRODUCTION METHOD

TECHNICAL FIELD

The present invention relates to an information recording medium, an information recording apparatus, an information recording method, an information reproduction apparatus and an information reproduction method.

BACKGROUND ART

FIG. 12 shows a conventional information recording medium 1201 and an example of a data structure of a channel signal 1203 to be recorded in the information recording medium 1201.

The channel signal 1203 is recorded on the information recording medium 1201 by a pickup 1202. The channel signal 1203 recorded on the information recording medium 1201 is reproduced by the pickup 1202.

The channel signal 1203 includes a plurality of SYNC codes and a plurality of modulated codes. Data is obtained by decoding the plurality of modulated codes included in the channel signal 1203.

FIGS. 13 and 14 each shows an example of sector data structure recorded on the information recording medium 1201.

Usually on the information recording medium 1201, coded data is recorded. A typical coding method is a digital modulation such as, for example, an 8-16 modulation method. Such a digital modulation restricts a frequency component of a signal to a certain level or less.

A SYNC code is inserted into the modulated data at a prescribed interval. The SYNC code has a special pattern which never appears in the modulated data. Insertion of such a SYNC code has the following advantage. When a bit shift is generated while data is being read, a SYNC code is reset at a correct bit position when the SYNC code is detected. Thus, data can be correctly read thereafter. A unit of data for which a SYNC code is provided is referred to as a "SYNC frame".

A sector includes at least one SYNC frame. A sector is provided with a sector address (i.e., a serial number for the sector). A sector address is recorded at a specific position of the sector (for example, at the head of a first SYNC frame).

The modulated SYNC frame data (modulated code) is demodulated, which is opposite to a modulation, so as to collect one sector of SYNC frame data. In this way, post-demodulation (post-decoding) sector data is obtained. At least one piece of such sector data is collected and rearranged so as to obtain a data structure. For this data structure, an error correction code (ECC; for example, a Reed-Solomon code) is formed.

At least one sector, which is a unit for which error correction is performed, is referred to as an "error correction block (or ECC block)". An ECC can correct a data error in a certain range. As a result, even when a bit shift is generated while the data is being read, correct data can be obtained at the end, as described above.

FIG. 13 shows an example of a sector data structure. In the example shown in FIG. 13, a SYNC code is either SY0 or SY1. The SYNC code SY0 is located at the head of a first SYNC frame, and the SYNC code SY1 is located at the head of each of second through 26th SYNC frames. Such location of the SYNC codes is advantageous for distinguishing the first SYNC frame of one sector from the other SYNC frames.

Assignment of two different types of SYNC codes to the SYNC frames as described above has an advantage that the head of the sector can be recognized without demodulating the modulated data (modulated code).

FIG. 14 shows another example of a sector data structure. The sector data structure is of a DVD (Digital Versatile Disk). In the example shown in FIG. 14, the SYNC code is either one of SY0 through SY7. The SYNC code SY0 is located at the head of a first SYNC frame. The SYNC code SY1 is located at the head of each of third, 11th and 19th SYNC frames. The SYNC code SY2 is located at the head of each of fifth, 13th and 21st SYNC frames. The SYNC code SY3 is located at the head of each of seventh, 15th and 23rd SYNC frames. The SYNC code SY4 is located at the head of each of ninth, 17th and 25th SYNC frames. The SYNC code SY5 is located at the head of each of second, fourth, sixth, eighth and tenth SYNC frames. The SYNC code SY6 is located at the head of each of 12th, 14th, 16th and 18th SYNC frames. The SYNC code SY7 is located at the head of each of 20th, 22nd, 24th and 26th SYNC frames. Such location of the SYNC codes are advantageous for specifying the position of the SYNC frame in one sector.

Assignment of eight different types of SYNC codes to the SYNC frames as described above has an advantage that the position of the SYNC frame in one sector can be recognized without demodulating the modulated data (modulated code).

The position of the SYNC frame in one sector are specified as follows in accordance with the sequence (recording order) of two SYNC codes included in two successive SYNC frames.

(SY7, SY0): first SYNC frame,
(SY0, SY5): second SYNC frame,
(SY5, SY1): third SYNC frame ((SY0, SY5, SY1)),
(SY1, SY5): fourth SYNC frame,
(SY5, SY2): fifth SYNC frame,
(SY2, SY5): sixth SYNC frame,
(SY5, SY3): seventh SYNC frame,
(SY3, SY5): eighth SYNC frame,
(SY5, SY4): ninth SYNC frame,
(SY4, SY5): tenth SYNC frame,
(SY5, SY1): 11th SYNC frame ((SY4, SY5, SY1)),
(SY1, SY6): 12th SYNC frame,
(SY6, SY2): 13th SYNC frame,
(SY2, SY6): 14th SYNC frame,
(SY6, SY3): 15th SYNC frame,
(SY3, SY6): 16th SYNC frame,
(SY6, SY4): 17th SYNC frame,
(SY4, SY6): 18th SYNC frame,
(SY6, SY1): 19th SYNC frame,
(SY1, SY7): 20th SYNC frame,
(SY7, SY2): 21st SYNC frame,
(SY2, SY7): 22nd SYNC frame,
(SY7, SY3): 23rd SYNC frame,
(SY3, SY7): 24th SYNC frame,
(SY7, SY4): 25th SYNC frame, and
(SY4, SY7): 26th SYNC frame.

By distinguishing the sequence of two SYNC codes included in two successive SYNC frames, the first and 2nd SYNC frames can be distinguished from each other, the fourth through tenth SYNC frames can be distinguished from each other, and the 12th through 26th SYNC frames can be distinguished from each other.

Depending on the sequence of two SYNC codes included in two successive SYNC frames, the third SYNC frame and the 11th SYNC frame cannot be distinguished from each other. In both of the third SYNC frame and the 11th SYNC frame, the SYNC codes are arranged as (SY5, SY1). In this case, a SYNC code immediately before SY5 can be added to distinguish the SYNC frames. When the SYNC code immediately before SY5 is "SY0", the SYNC frame is determined to be the third SYNC frame. When the SYNC code immediately before SY5 is "SY4", the SYNC frame is determined to be the 11th SYNC frame.

FIG. 15 shows an NRZ (Not Return Zero) representation of patterns of eight types of SYNC codes. In the case of a DVD, one of SYNC code 1 and SYNC code 2 shown in FIG. 15 is selected so as to minimize a DC component of a signal to be recorded.

FIG. 16 shows an example of a structure of a conventional information reproduction apparatus 1600.

The information reproduction apparatus 1600 includes a pickup 1601, a SYNC code detector 1602, a decoder 1603, a memory control circuit 1604, and a memory 1605.

The pickup 1601 reproduces a channel signal recorded on the information recording medium 1201 and thus outputs the reproduced channel signal.

The SYNC code detector 1602 detects a SYNC code included in the reproduced channel signal and thus separates the SYNC code from a modulated code also included in the reproduced channel signal. The modulated code which is correctly synchronized by the SYNC code is output to the decoder 1603.

The decoder 1603 decodes (demodulates) the modulated code and thus generates data for each SYNC frame. The data for each SYNC frame is output to the memory control circuit 1604.

The memory control circuit 1604 generates data based on the data for each SYNC frame, and stores the generated data in the memory 1605.

FIG. 17 shows another example of a structure of a conventional information reproduction apparatus 1700. In FIG. 17, identical elements to those described with reference to FIG. 16 will bear identical reference numerals therewith and description thereof will be omitted.

The information reproduction apparatus 1700 includes a SYNC frame position estimation device 1701 in addition to the elements included in the information reproduction apparatus 1600.

The SYNC frame position estimation device 1701 estimates a correct position of a SYNC frame in accordance with the SYNC code (or variation code) which is output from the SYNC code detector 1602. A signal indicating the position of the SYNC frame is output to the memory control circuit 1604.

The memory control circuit 1604 generates data based on the signal indicating the position of the SYNC frame output from the SYNC frame position estimation device 1701. In this way, data can be stored at a more correct SYNC frame position.

FIG. 18 shows an example of a structure of a conventional information recording apparatus 1800.

The information recording apparatus 1800 includes a pickup 1801, a SYNC code insertion device 1802, an encoder 1803, a memory control circuit 1804, and a memory 1805.

The memory control circuit 1804 reads data stored in the memory 1805 and generates data for each SYNC frame based on the read data. The data for each SYNC frame is output to the encoder 1803.

The encoder 1803 encodes the data for each SYNC frame and thus generates a modulated code. The modulated code is output to the SYNC code insertion device 1802.

The SYNC code insertion device 1802 inserts a SYNC code between the modulated codes and thus generates a channel signal. The channel signal is output to the pickup 1801.

The above-described conventional structures have the following problem. When data other than modulated code (for example, attribute information for protecting copyright, such as an encryption key) is to be recorded on an information recording medium in the state of being embedded in sector data or data in an ECC block, the data structure of the modulated code in the sector data or the data structure of the ECC block needs to be changed. This requires an extensive change of the design of the information reproduction apparatus or the information recording apparatus.

The present invention has an objective of providing an information recording medium for allowing data other than modulated code to be embedded in sector data without changing a data structure of the modulated code in the sector data.

The present invention has another objective of providing an information recording medium for allowing data other than modulated code to be embedded in data in an ECC block without changing a data structure of the ECC block.

The present invention has still another objective of providing an information recording apparatus, an information recording method, an information reproduction apparatus and an information reproduction method for such an information recording medium.

DISCLOSURE OF THE INVENTION

According to one aspect of the invention, an information recording medium includes a plurality of modulated data areas for recording a plurality of modulated codes; and a plurality of SYNC code areas for recording a plurality of SYNC codes. Data other than the plurality of modulated codes is recorded in at least one of the plurality of SYNC code areas in the form of at least one SYNC code.

In one embodiment of the invention, the data is for protecting copyright of contents to be recorded in the information recording medium.

In one embodiment of the invention, each of the plurality of SYNC code areas includes an identification code area for recording an identification code for identifying the SYNC code, and a variation code area for recording a variation code for indicating a variation of the SYNC code. The data is recorded in at least one of a plurality of variation code areas in the form of at least one variation code.

In one embodiment of the invention, each of the plurality of SYNC codes is either one of SY0, SY1 and SY2; the SYNC code SY0 is recorded in the SYNC code area located at the head of a sector area for recording sector data; each of the SYNC codes SY1 and SY2 is recorded in the SYNC code area located at a position other than the head of the sector area; and the data is represented by a sequence including at least one of the SYNC codes SY1 and SY2.

In one embodiment of the invention, each of the plurality of SYNC codes is either one of SY0 through SY7; the SYNC code SY0 is recorded in the SYNC code area located at the head of a sector area for recording sector data having a plurality of SYNC frames; each of the SYNC codes SY1 through SY7 is recorded in the SYNC code area located at a position other than the head of the sector area; and at least a part of the data is represented by a sequence of two SYNC codes respectively included in two predetermined successive SYNC frames among the plurality of SYNC frames.

In one embodiment of the invention, the sequence of the two SYNC codes is one of (SY1, SY1), (SY1, SY2), (SY1, SY3), (SY1, SY4), (SY2, SY1), (SY2, SY2), (SY2, SY3), (SY2, SY4), (SY3, SY1), (SY3, SY2), (SY3, SY3), (SY3, SY4), (SY4, SY1), (SY4, SY2), (SY4, SY3), and (SY4, SY4).

According to another aspect of the invention, an information recording apparatus for recording information on an information recording medium is provided. The information recording medium includes a plurality of modulated data areas for recording a plurality of modulated codes, and a plurality of SYNC code areas for recording a plurality of SYNC codes. The information recording apparatus includes an encoder for encoding additional data so as to generate data in the form of at least one SYNC code; and a recording section for recording the data in the form of the at least one SYNC code in at least one of the plurality of SYNC code areas.

According to still another aspect of the invention, an information recording method for recording information on an information recording medium is provided. The information recording medium includes a plurality of modulated data areas for recording a plurality of modulated codes, and a plurality of SYNC code areas for recording a plurality of SYNC codes. The information recording method includes the steps of encoding additional data so as to generate data in the form of at least one SYNC code; and recording the data in the form of the at least one SYNC code in at least one of the plurality of SYNC code areas.

According to still another aspect of the invention, an information reproduction apparatus for reproducing information recorded on an information recording medium is provided. The information recording medium includes a plurality of modulated data areas for recording a plurality of modulated codes, and a plurality of SYNC code areas for recording a plurality of SYNC codes, wherein data obtained by encoding additional data is recorded in at least one of the plurality of SYNC code areas in the form of at least one SYNC code. The information reproduction apparatus includes a SYNC code detector for detecting the data recorded in the at least one of the plurality of SYNC code areas in the form of the at least one SYNC code; and a decoder for decoding the detected data in the form of the at least one SYNC code so as to generate the additional data.

According to still another aspect of the invention, an information reproduction method for reproducing information recorded on an information recording medium is provided. The information recording medium includes a plurality of modulated data areas for recording a plurality of modulated codes, and a plurality of SYNC code areas for recording a plurality of SYNC codes, wherein data obtained by encoding additional data is recorded in at least one of the plurality of SYNC code areas in the form of at least one SYNC code. The information reproduction method includes the steps of detecting the data recorded in the at least one of the plurality of SYNC code areas in the form of the at least one SYNC code; and decoding the detected data in the form of the at least one SYNC code so as to generate the additional data.

BRIEF DESCRIPTION OF THE DRAWINGS

FIG. 13 shows an example of a conventional sector data.

FIG. 14 shows an example of a conventional sector data.

FIG. 15 shows an NRZ (Not Return Zero) representation of patterns of eight types of SYNC codes usable for a DVD.

FIG. 18 shows an example of a structure of a conventional information recording apparatus 1800.

BEST MODE FOR CARRYING OUT THE INVENTION

Hereinafter, the present invention will be described by way of illustrative examples with reference to the attached drawings.

EXAMPLE 1

Figure 1:
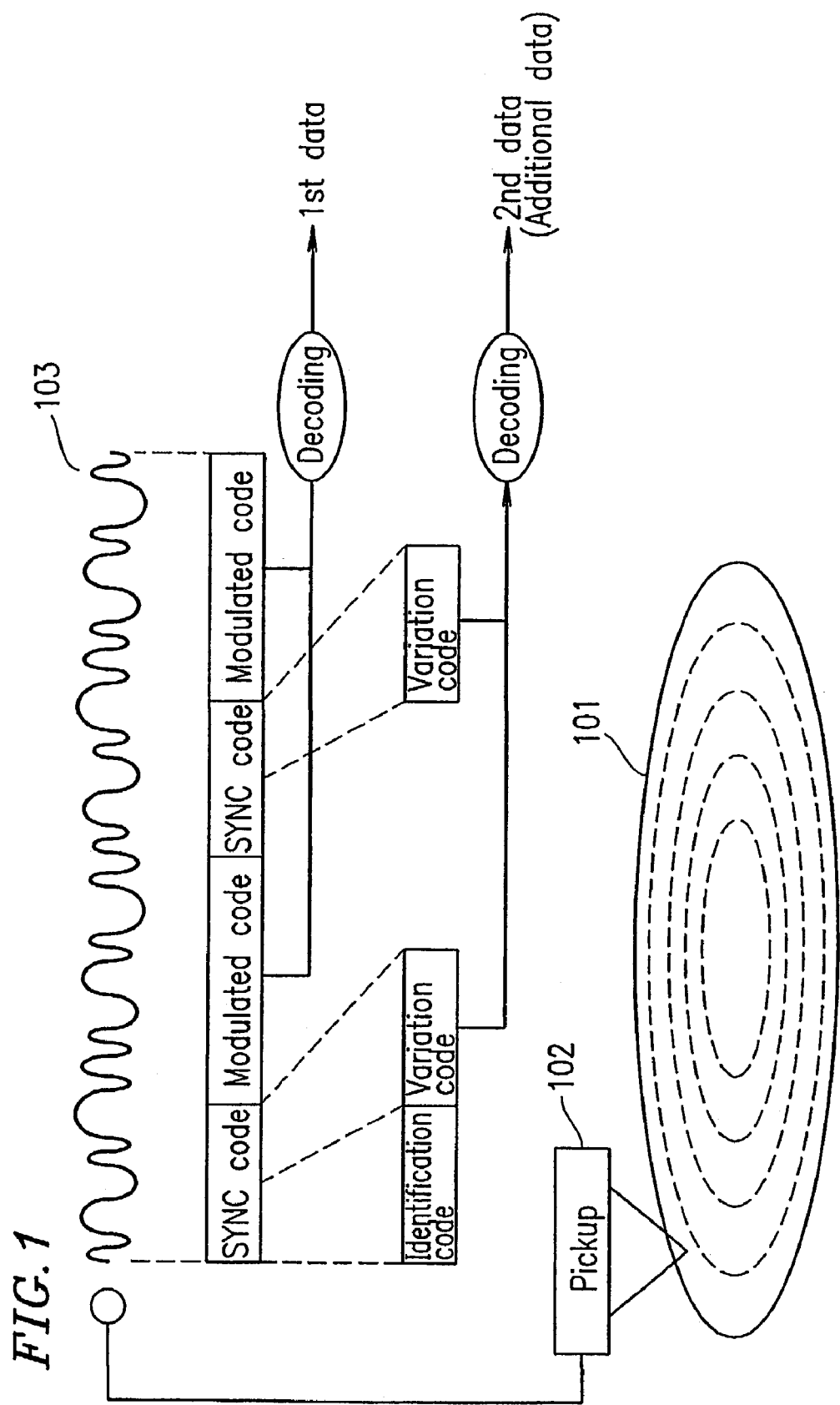
FIG. 1 shows an information recording medium 101 according to the present invention and an example of a data structure of a channel signal 103 which can be recorded on the information recording medium 101.

FIG. 1 shows an information recording medium 101 according to the present invention and an example of a data structure of a channel signal 103 which can be recorded on the information recording medium 101.

The channel signal 103 is recorded on the information recording medium 101 by a pickup 102. The channel signal 103 recorded on the information recording medium 101 is reproduced by the pickup 102.

The channel signal 103 includes a plurality of modulated codes and a plurality of SYNC codes. The modulated codes and the SYNC codes are alternately arranged. The SYNC code are provided to the modulated codes in order to correctly synchronize the modulated codes. Such a channel signal 103 is obtained by, for example, inserting a plurality of SYNC codes into an encoded data stream at a prescribed interval (at an equal interval or an unequal interval).

The plurality of SYNC codes each include an identification code for identifying the SYNC code and a variation code for indicating the variation of the SYNC code.

First data is obtained by decoding the plurality of modulated codes included in the channel signal 103. Second data (additional data) which is different from the first data is obtained by decoding at least one of the plurality of variation codes included in the channel signal 103. The second data is obtained in this way because data other than the plurality of modulated codes is embedded in the information recording medium 101 in the form of at least one variation code. The data embedded in the information recording medium 101 can be, for example, data for protecting copyright of contents recorded on the information recording medium 101.

Figure 2:
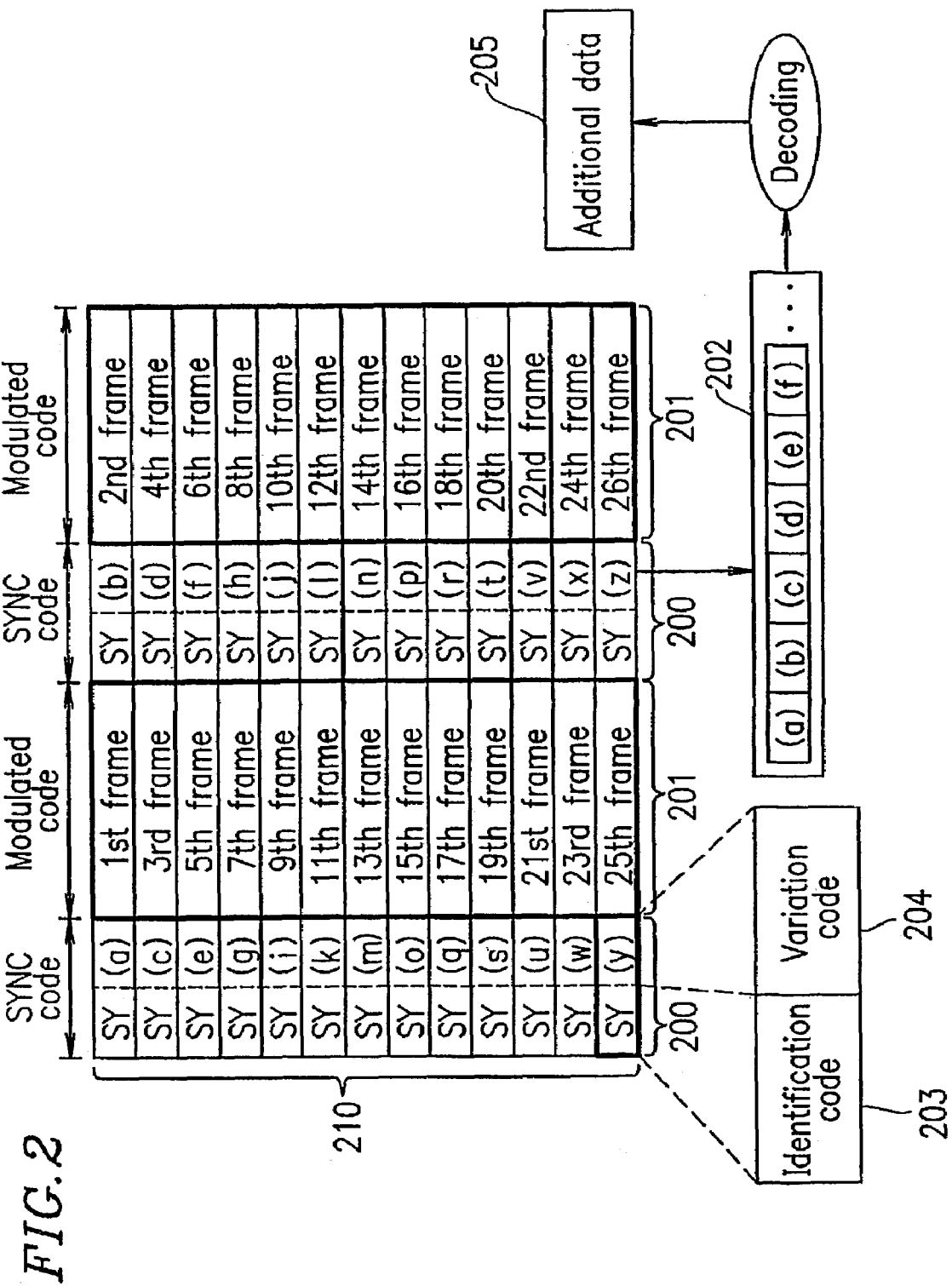
FIG. 2 shows an example of a sector data structure which can be recorded on the information recording medium 101 shown in FIG. 1.

FIG. 2 shows an example of a sector data structure which can be recorded on the information recording medium 101 shown in FIG. 1. The sector data is a minimum unit of data which can be recorded on the information recording medium 101.

The sector data is divided into a plurality of SYNC frames (26 SYNC frames from first through 26th SYNC frames in the example shown in FIG. 2). The plurality of SYNC frames each include a SYNC code and a modulated code. The SYNC code includes an identification code for identifying the SYNC code and a variation code for indicating the variation of the SYNC code.

In the example shown in FIG. 2, the identification code is "SY". The variation codes are represented by letters of "(a)" through "(Z)" and distinguishable from each other. Each variation code can be, for example, represented with one of the numbers 0 through 25.

The identification code can be N-bit data. In this case, each identification code can be represented by one of the numbers 0 through $(2^N)-1$. N is an arbitrary natural number, and ^represents a power operator. For example, N can be 1.

The information recording medium 101 (FIG. 1) includes a sector area 210 for recording sector data. The sector area 210 includes a plurality of SYNC code areas 200 for recording a plurality of SYNC codes respectively and a plurality of modulated code areas 201 for recording a plurality of modulated codes respectively. The plurality of SYNC code areas 200 include an identification area 203 for recording an identification code and a variation code area 204 for recording a variation code.

In FIG. 2, reference numeral 202 represents a string of the variation codes (variation codes "(a)", "(b)", "(c)", "(d)", "(e)", "(f)", . . . ). The string of the variation codes can be a string of all the variation codes included in the sector data or a string of at least one variation code included in the sector data. Additional data 205 is obtained by decoding the string 202 of the variation codes.

Figure 3:
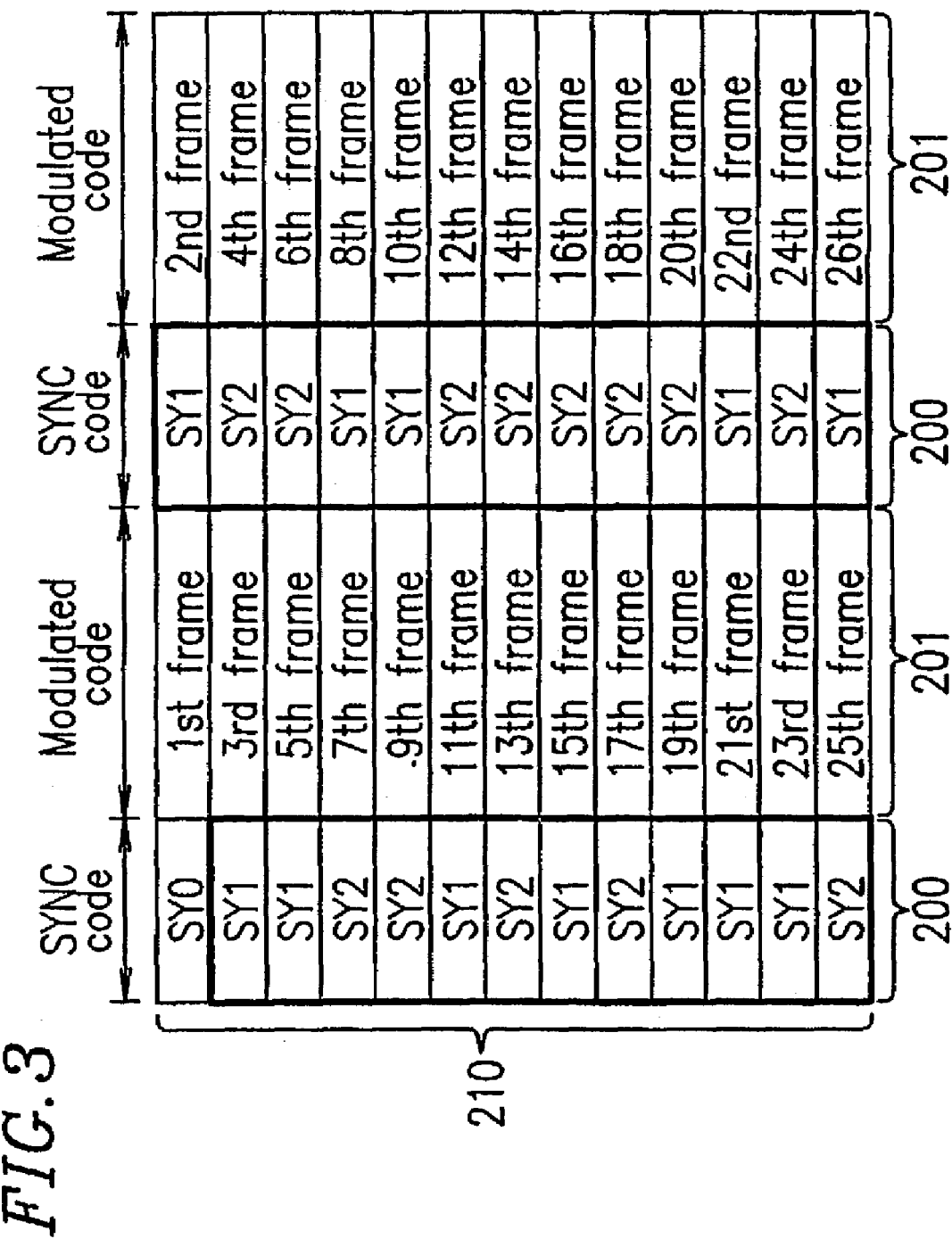
FIG. 3 shows a specific example of a sector data structure shown in FIG. 2.

FIG. 3 shows a specific example of the sector data structure shown in FIG. 2. The sector data structure shown in FIG. 3 is an improvement from the conventional sector data structure shown in FIG. 13. The sector data shown in FIG. 3 can be recorded in the sector area 210 of the information recording medium 101 (FIG. 1).

The sector data is divided into 26 SYNC frames of first through 26th SYNC frames. The first through 26th SYNC frames each include a SYNC code and a modulated code. The SYNC code is recorded in the respective SYNC code area 200, and the modulated code is recorded in the respective modulated code area 201.

In the example shown in FIG. 3, the SYNC code is one of SY0, SY1 and SY2. SY0 indicates a SYNC code of variation code=0. SY1 indicates a SYNC code of variation code=1. SY2 indicates a SYNC code of variation code=2.

The SYNC code SY0 is recorded in the SYNC code area 200 located at the head of the sector area 210. Each of the SYNC codes SY1 and SY2 is recorded in the SYNC code area 200 located at a position other than the head of the sector area 210.

In the example shown in FIG. 3, the additional data 205 (FIG. 2) is obtained by first arranging the SYNC codes included in the second through 26th SYNC frames in the order of the number of the SYNC frames (from a smaller number to a larger number) to generate a string of the SYNC codes and then decoding the string of the SYNC codes. For example, it is assumed that value 0 is obtained by decoding the SYNC code SY1 and value 1 is obtained by decoding the SYNC code SY2. In this case, additional data 205 (0, 0, 1, 0, 1, 1, 0, 1, 0, 0, 1, 1, 1, 0, 1, 1, 1, 0, 1, 0, 0, 0, 1, 1, 0) is obtained by decoding the string of the SYNC codes included in the second through 26th SYNC frames (SY1, SY1, SY2, SY1, SY2, SY2, SY1, SY2, SY1, SY1, SY2, SY2, SY2, SY1, SY2, SY2, SY2, SY1, SY2, SY1, SY1, SY1, SY2, SY2, SY1).

Thus, the additional data 205 "0010110100111011101000110)" can be obtained based on the data of the SYNC code form embedded in the sector data.

In this manner, the additional data 205 is obtained by decoding a string of SYNC codes, which includes at least one of SYNC codes SY1 and SY2 respectively included in at least one SYNC frame.

An ECC (Error Correction Code) can be generated for the additional data for each sector. In this case, even when an error is generated in a channel signal read from the information recording medium 101, the error can be corrected using the ECC, thus obtaining correct additional data. The additional data can be collected for a plurality of sectors. In this case, a stronger ECC (for example, a Reed-Solomon code) can be generated.

The data recorded in the SYNC code area 200 can be scrambled (encrypted). The data can be scrambled (encrypted) by, for example, replacing prescribed bits of data, or producing an exclusive OR of the data and a pseudorandom number. The scrambled (encrypted) data cannot be descrambled (decrypted) into the original data unless the method for descrambling (decrypting) the scrambled (encrypted) data is known. The scrambling (encryption) of data can be preferably used when information required to be kept secret, such as, for example, an encryption key, is recorded on the information recording medium 101.

As described above, the present invention provides an information recording medium for allowing data other than modulated code to be embedded in sector data or data in an ECC block without changing a data structure of the modulated code in the sector data or a data structure of the ECC block. According to the present invention, data other than the data embedded in the sector data or the data in an ECC block can be reproduced using a conventional information reproduction apparatus.

EXAMPLE 2

Figure 4:
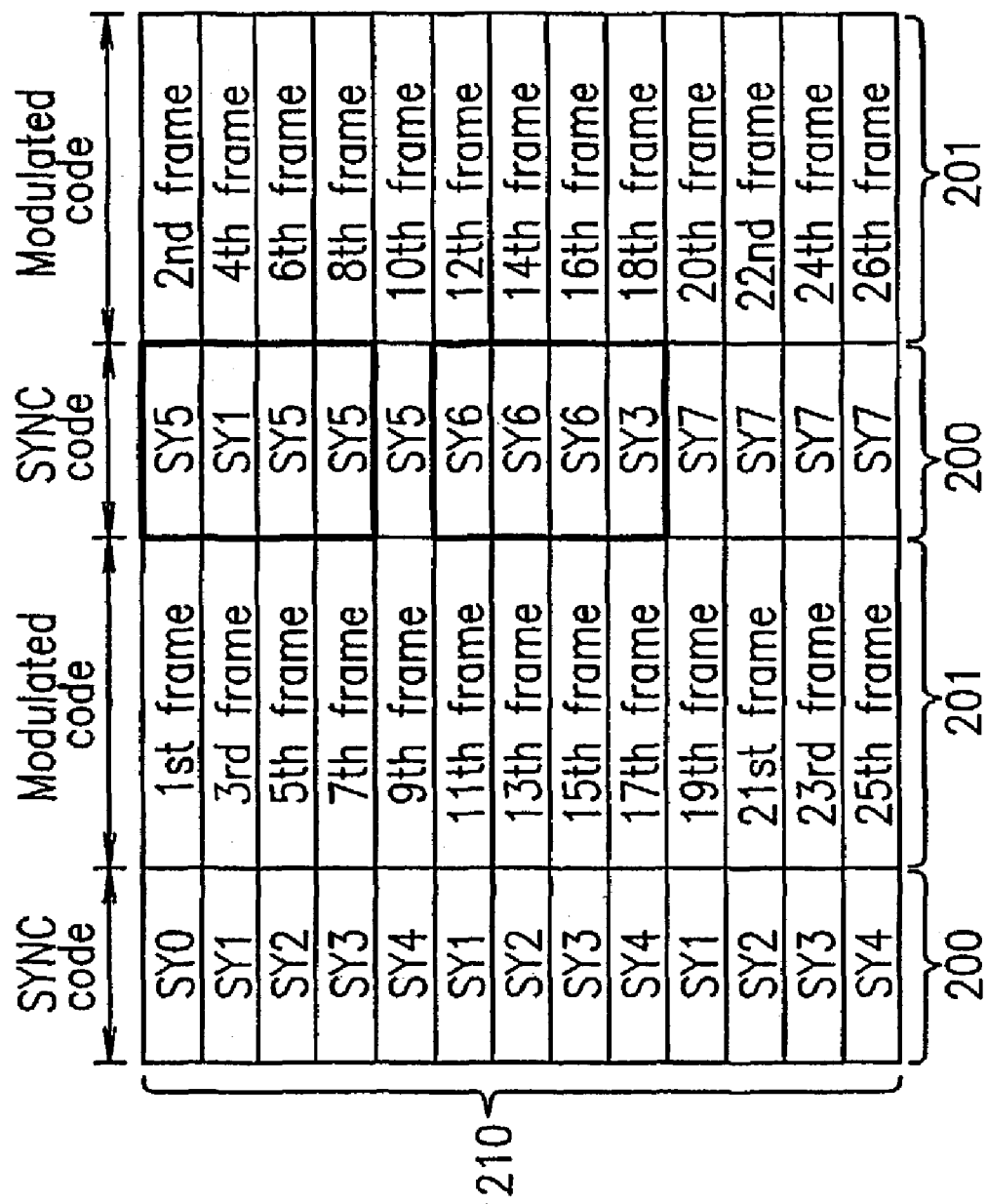
FIG. 4 shows another specific example of a sector data structure shown in FIG. 2.

FIG. 4 shows a specific example of the sector data structure shown in FIG. 2. The sector data structure shown in FIG. 4 is an improvement from the sector data structure of a conventional DVD shown in FIG. 14. The sector data shown in FIG. 4 can be recorded in the sector area 210 of the information recording medium 101 (FIG. 1).

The sector data is divided into 26 SYNC frames from first through 26th SYNC frames. The first through 26th SYNC frames each include a SYNC code and a modulated code. The SYNC code is recorded in the respective SYNC code area 200, and the modulated code is recorded in the respective modulated code area 201.

In the example shown in FIG. 4, the SYNC code is one of SY0 through SY7. SYi indicates a SYNC code of variation code=i. Here, i=0, 1, 2, . . . 7.

In the example shown in FIG. 4, at least a part of data embedded in the sector data is represented by a sequence (a recording order) of two SYNC codes respectively included in two successive SYNC frames. The sequence of the two SYNC codes used for representing at least a part of the data embedded in the sector data is as follows.

(SY1, SY1), (SY1, SY2), (SY1, SY3), (SY1, SY4), (SY2, SY1), (SY2, SY2), (SY2, SY3), (SY2, SY4), (SY3, SY1), (SY3, SY2), (SY3, SY3), (SY3, SY4), (SY4, SY1), (SY4, SY2), (SY4, SY3), (SY4, SY4).

These 16 sequence of SYNC codes are "sequences of SYNC codes not existing in the DVD standards".

These 16 sequences of SYNC codes are different from the 25 sequences of SYNC codes for specifying the position of the SYNC frame described with reference to FIG. 14. Accordingly, it can be clearly distinguished whether the sequence of two SYNC codes included in two successive SYNC frames represents at least a part of the data embedded in the sector data or specifies the position of the SYNC frame.

For example, each sequence of two SYNC codes included in two successive SYNC frames shown in FIG. 4 can be interpreted as follows by sequentially decoding the sequence.

(SY7, SY0): first SYNC frame
(SY0, SY5): second SYNC frame,
(SY5, SY1): third SYNC frame or 11th SYNC frame,
(SY1, SY1): information indicating a part of the data (adopted)
(SY1, SY2): information indicating a part of the data (ignored)
(SY2, SY5): sixth SYNC frame,
(SY5, SY3): seventh SYNC frame,
(SY3, SY5): eighth SYNC frame,
(SY5, SY4): ninth SYNC frame,
(SY4, SY5): tenth SYNC frame,
(SY5, SY1): 3rd SYNC frame or 11th SYNC frame,
(SY1, SY6): 12th SYNC frame,
(SY6, SY2): 13th SYNC frame,
(SY2, SY6): 14th SYNC frame,
(SY6, SY3): 15th SYNC frame,
(SY3, SY6): 16th SYNC frame,
(SY6, SY4): 17th SYNC frame,
(SY4, SY3): information indicating a part of the data (adopted)
(SY3, SY1): information indicating a part of the data (ignored)
(SY1, SY7): 20th SYNC frame,
(SY7, SY2): 21st SYNC frame,
(SY2, SY7): 22nd SYNC frame,
(SY7, SY3): 23rd SYNC frame,
(SY3, SY7): 24th SYNC frame,
(SY7, SY4): 25th SYNC frame, and
(SY4, SY7): 26th SYNC frame.

Thus, four sequences of SYNC codes, i.e., (SY1, SY1), (SY1, SY2), (SY4, SY3) and (SY3, SY1) are detected as candidates for information indicating a part of the data. Among the four sequences, (SY1, SY1) and (SY4, SY3) are adopted as information indicating a part of the data, and (SY1, SY2) and (SY3, SY1) are not adopted as information indicating a part of the data (i.e., ignored). This occurs for the following reason. When the SYNC code in one SYNC frame is replaced, such a replacement inevitably influences two sets of sequences of SYNC codes. Therefore, it has been regulated that one of the two sets of sequences of SYNC codes is adopted as information indicating a part of the data.

As described above, by interpreting the sequences of two SYNC codes included in two successive SYNC frames, it is detected that the SYNC code in the fourth SYNC frame is replaced with SY1 and the SYNC code in the 18th SYNC frame is replaced with SY3, as compared with the sector data shown in FIG. 14.

In the example shown in FIG. 4, information indicating the positions of the fourth, fifth, 18th and 19th SYNC frames cannot be detected based on sequences of SYNC codes included in two successive SYNC frames. However, this does not cause any problem because the information indicating the positions of these SYNC frames can be interpolated based on the information indicating the positions of other SYNC frames (for example, information indicating the positions of SYNC frames immediately before these SYNC frames). In the example shown in FIG. 4, information indicating the positions of only four SYNC frames out of 26th SYNC frames is lost. Accordingly, the information indicating the positions of these SYNC frames can be interpolated with the information indicating the positions of other SYNC frames with a sufficient precision.

In the example shown in FIG. 4, the SYNC codes in the fourth SYNC frame and the 18th SYNC frame are replaced as compared to the sector data shown in FIG. 14 as described above. The present invention is not limited to such replacement.

When the additional data is encoded in the information recording medium 101 of the present invention, the SYNC code of either one of the second, fourth, sixth and eight SYNC frames is replaced with either one of SY1, SY2, SY3 and SY4. The SYNC code of either one of the 12th, 14th, 16th and 18th SYNC frames is replaced with either one of SY1, SY2, SY3 and SY4. Such replacement of the SYNC code can be achieved by, for example, replacing a variation code included in the SYNC code.

The default of the SYNC code of each of the second, fourth, sixth and eighth SYNC frames is SY5. Accordingly, as a result of the above-described replacement of the SYNC code, the SYNC code of either one of the four SYNC frames is either one of SY1 through SY4, and the SYNC code of each of the remaining three SYNC frames is SY5.

The default of the SYNC code of each of the 12th, 14th, 16th and 18th SYNC frames is SY6. Accordingly, as a result of the above-described replacement of the SYNC code, the SYNC code of either one of the four SYNC frames is either one of SY1 through SY4, and the SYNC code of each of the remaining three SYNC frames is SY6.

In FIG. 4, the SYNC codes of the eight SYNC frames, the SYNC code of which have been replaced as described above (i.e., the second, fourth, sixth, eighth SYNC frames and the 12th, 14th, 16th and 18th SYNC frames) are shown surrounded by the bold lines.

In the example shown in FIG. 4, 8-bit additional data is obtained by detecting the replacement of the SYNC code based on the sequence of two SYNC codes included in two successive SYNC frames and then decoding the replacement of the SYNC code.

It is assumed here that the 8-bit additional data includes bit 7 through bit 0. In this case, the value of each bit is determined as follows.

Values of bits 7 and 6: "00" (when the SYNC code of the second SYNC frame has been replaced)

Values of bits 7 and 6: "01" (when the SYNC code of the fourth SYNC frame has been replaced)

Values of bits 7 and 6: "10" (when the SYNC code of the sixth SYNC frame has been replaced)

Values of bits 7 and 6: "11" (when the SYNC code of the eighth SYNC frame has been replaced)

Values of bits 5 and 4: "00" (when the SYNC code of one of the second, fourth, sixth and eighth SYNC frames as a result of the replacement is (SY1))

Values of bits 5 and 4: "01" (when the SYNC code of one of the second, fourth, sixth and eighth SYNC frames as a result of the replacement is (SY2))

Values of bits 5 and 4: "10" (when the SYNC code of one of the second, fourth, sixth and eighth SYNC frames as a result of the replacement is (SY3))

Values of bits 5 and 4: "11" (when the SYNC code of one of the second, fourth, sixth and eighth SYNC frames as a result of the replacement is (SY4))

Values of bits 3 and 2: "00" (when the SYNC code of the 12th SYNC frame has been replaced)

Values of bits 3 and 2: "01" (when the SYNC code of the 14th SYNC frame has been replaced)

Values of bits 3 and 2: "10" (when the SYNC code of the 16th SYNC frame has been replaced)

Values of bits 3 and 2: "11" (when the SYNC code of the 18th SYNC frame has been replaced)

Values of bits 1 and 0: "00" (when the SYNC code of one of the 12th, 14th, 16th and 18th SYNC frames as a result of the replacement is (SY1))

Values of bits 1 and 0: "01" (when the SYNC code of one of the 12th, 14th, 16th and 18th SYNC frames as a result of the replacement is (SY2))

Values of bits 1 and 0: "10" (when the SYNC code of one of the 12th, 14th, 16th and 18th SYNC frames as a result of the replacement is (SY3))

Values of bits 1 and 0: "11" (when the SYNC code of one of the 12th, 14th, 16th and 18th SYNC frames as a result of the replacement is (SY4))

In this way, the 8-bit additional data "01001110" (bits 7 through 0) can be obtained based on the data in the form of SYNC codes embedded in the sector data in this way.

As in Example 1, an ECC can be generated for the resultant additional data, or the resultant additional data can be scrambled.

Alternatively, the following nineسequences of SYNC codes can be used for representing at least a part of the data embedded in the sector data. These nine sequences of SYNC codes are "sequences of SYNC codes not existing in the DVD standards".

(SY5, SY5), (SY5, SY6), (SY5, SY7), (SY6, SY5), (SY6, SY6), (SY6, SY7), (SY7, SY5), (SY7, SY6), (SY7, SY7).

The number of SYNC codes in each sequence is not limited to two. The number of the SYNC codes in each sequence can be M, where M is an integer of three or more. The replacement of the SYNC code can be detected based on the sequences of M SYNC codes included in M successive SYNC frames. A position L of the SYNC frame in which the SYNC code is replaced (the distance between the head of the sector and an L'th SYNC frame in which the SYNC code is replaced) can be fixed or variable in a certain range. For example, the values of bits 6 and 7 of the above-described 8-bit additional data is determined in accordance with M=2 and L=2, 4, 6 or 8. The values of bits 2 and 3 of the above-described 8-bit additional data is determined in accordance with M=2 and L=12, 14, 16, or 18.

As described above, the present invention provides an information recording medium for allowing data other than modulated code to be embedded in sector data or data in an ECC block without changing a data structure of the modulated code in the sector data or a data structure of the ECC block. According to the present invention, data other than the data embedded in the sector data or the data in an ECC block can be reproduced using a conventional information reproduction apparatus.

EXAMPLE 3

Figure 5:
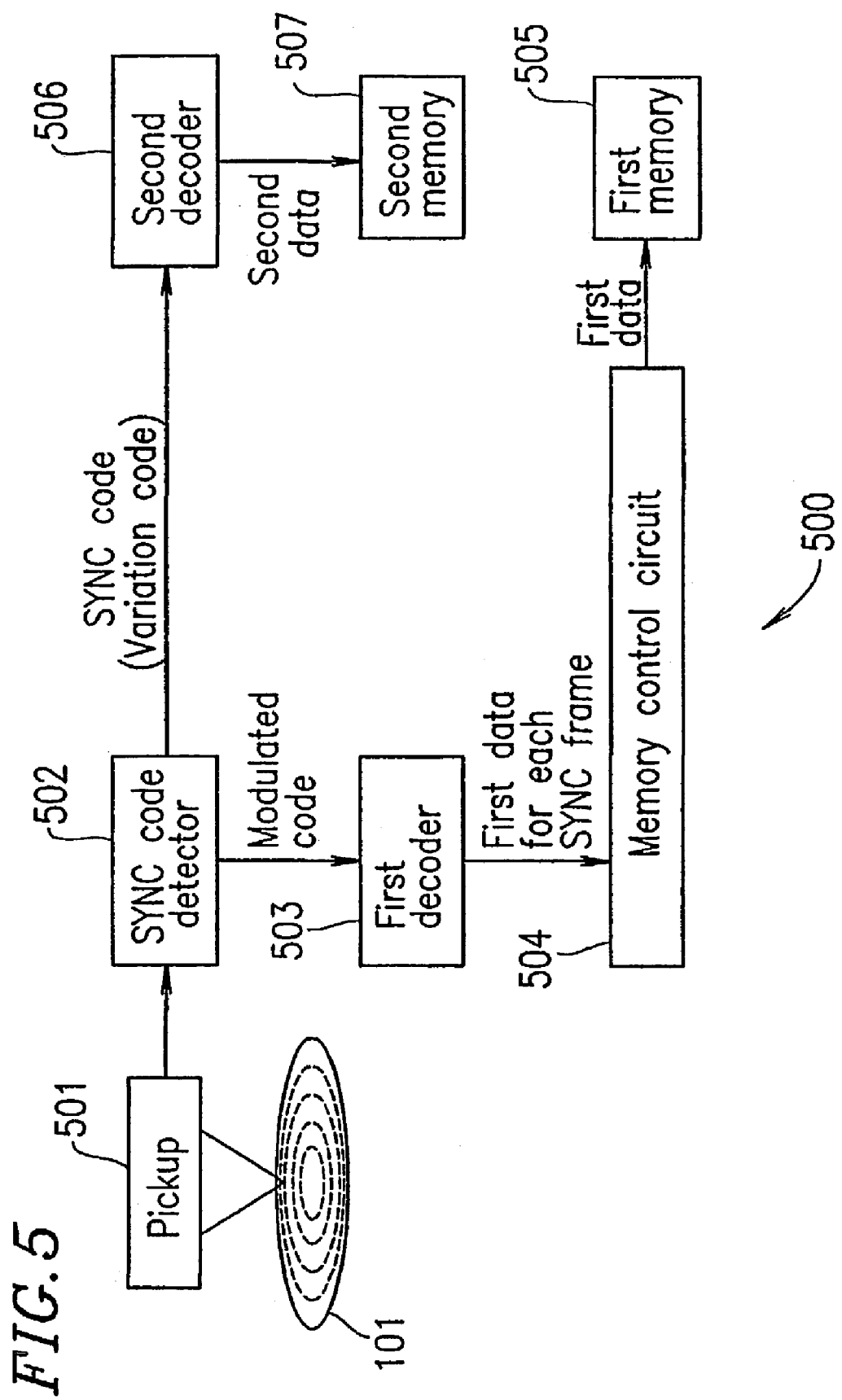
FIG. 5 shows a structure of an information reproduction apparatus 500 according to the. present invention.

FIG. 5 shows a structure of an information reproduction apparatus 500 according to the present invention.

The information reproduction apparatus 500 includes a pickup 501, a SYNC code detector 502, a first decoder 503, a memory control circuit 504, a first memory 505, a second decoder 506, and a second memory 507.

The pickup 501 reproduces a channel signal recorded on the information recording medium 101 and thus outputs the reproduced channel signal. Such a reproduction operation is performed by, for example, converting a change in a physical characteristic of the information recording medium 101 (for example, a change in a reflectance) into a channel signal.

The SYNC code detector 502 detects a SYNC code included in the reproduced channel signal and thus separates the SYNC code from a modulated code also included in the reproduced channel signal. The modulated code is output to the first decoder 503. The SYNC code is output to the second decoder 506.

The first decoder 503 decodes the modulated code and thus generates first data for each SYNC frame. The first data for each SYNC frame is output to the memory control circuit 504.

The memory control circuit 504 generates first data based on the first data for each SYNC frame, and stores the generated first data in the first memory 505.

The second decoder 506 decodes the SYNC code and thus generates second data (additional data). The second decoder 506 then stores the generated second data (additional data) in the second memory 507. The SYNC code can be decoded in the decoding method described in Examples 1 and 2.

The SYNC code detector 502 can output a variation code, instead of the SYNC code, to the second decoder 506. In this case, the second decoder 506 decodes the variation code and thus generates second data (additional data), and then stores the generated second data (additional data) in the second memory 507. The variation code can be decoded in the decoding method described in Examples 1 and 2.

Figure 6:
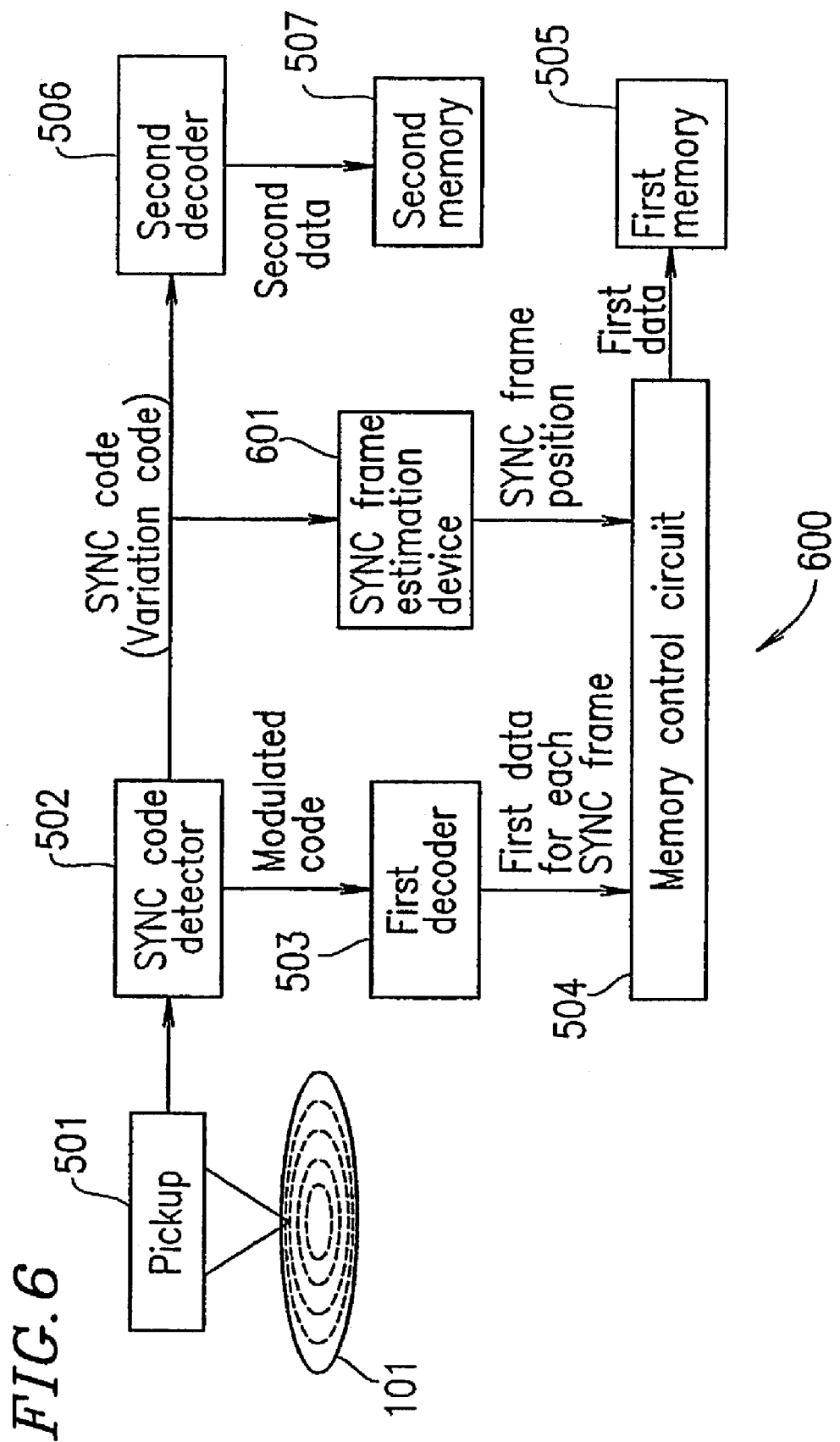
FIG. 6 shows an exemplary structure of another information reproduction apparatus 600 according to the present invention.

FIG. 6 shows a structure of another information reproduction apparatus 600 according to the present invention. In FIG. 6, identical elements to those described with reference to FIG. 5 will bear identical reference numerals therewith and description thereof will be omitted.

The information reproduction apparatus 600 includes a SYNC frame position estimation device 601 in addition to the elements included in the information reproduction apparatus 500.

The SYNC frame position estimation device 601 estimates a correct position of a SYNC frame based on the SYNC code (or the variation code) which is output from the SYNC code detector 502. A signal indicating the position of the SYNC frame is output to the memory control circuit 504.

The memory control circuit 504 generates first data based on the signal indicating the position of the SYNC frame which is output from the SYNC frame position estimation device 601. In this way, data can be stored at a more correct SYNC frame position.

The present invention provides an information reproduction apparatus for decoding a SYNC code (or a variation code) recorded on an information recording medium and thus generating additional data.

EXAMPLE 4

Figure 7:
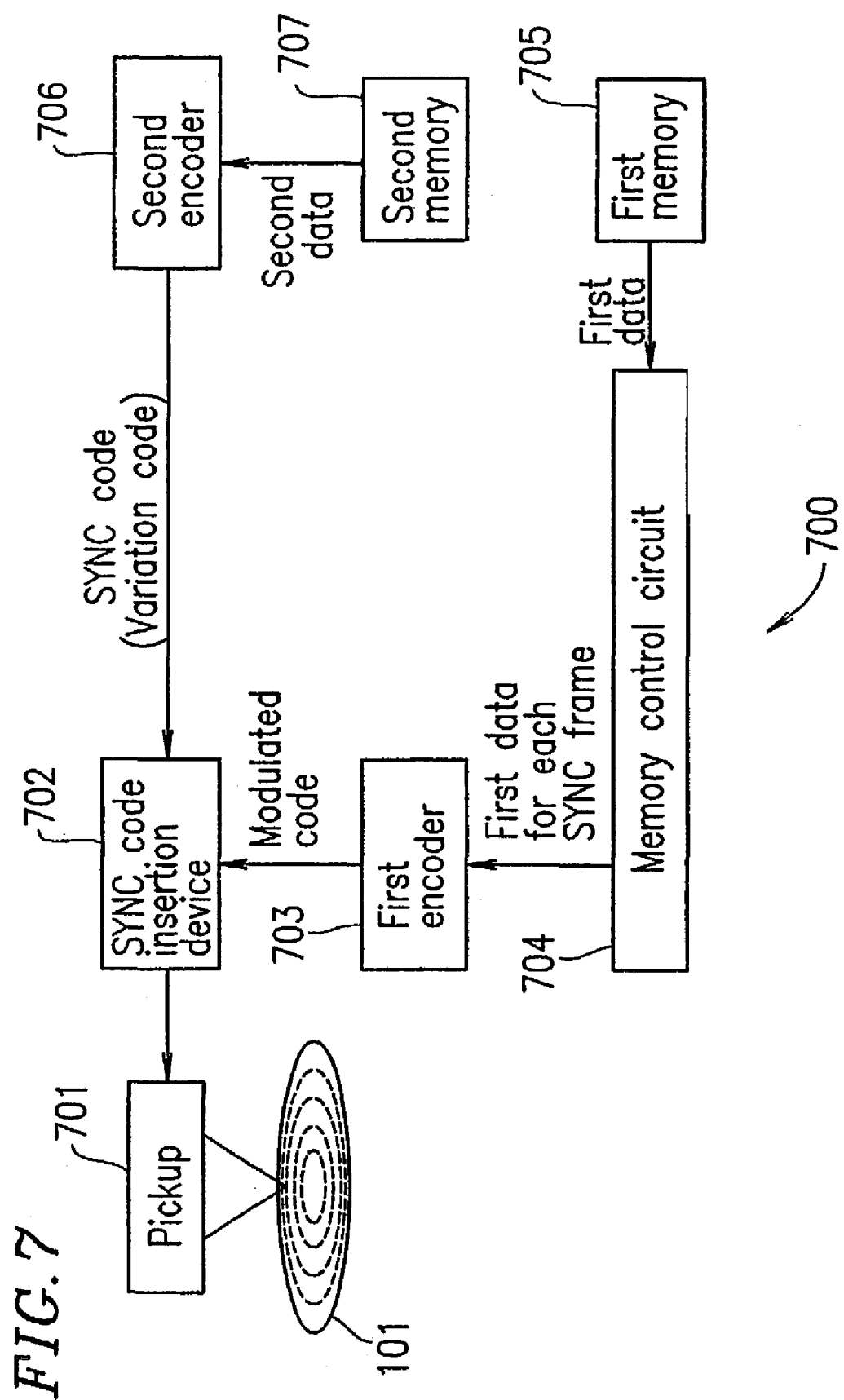
FIG. 7 shows an exemplary structure of an information recording apparatus 700 according to the present invention.

FIG. 7 shows a structure of an information recording apparatus 700 according to the present invention.

The information recording apparatus 700 includes a pickup 701, a SYNC code insertion device 702, a first encoder 703, a memory control circuit 704, a first memory 705, a second encoder 706, and a second memory 707.

The memory control circuit 704 reads first data stored in the first memory 705 and generates first data for each SYNC frame based on the read first data. The first data for each SYNC frame is output to the first encoder 703.

The first encoder 703 encodes the first data for each SYNC frame and thus generates a modulated code. The modulated code is output to the SYNC code insertion device 702.

The second encoder 706 reads and encodes second data (additional data) recorded in the second memory 707 and thus generates a SYNC code. The second data (additional data) can be encoded by an encoding method which corresponds to inverse conversion of the decoding method described in Examples 1 and 2.

The SYNC code insertion device 702 inserts the SYNC code between the modulated codes and thus generates a channel signal. The channel signal is output to the pickup 701. It is not necessary that the SYNC code insertion device 702 inserts the SYNC code output from the second encoder 706 to all the SYNC frames in the sector data. For example, the SYNC code insertion device 702 can insert the SYNC code output from the second encoder 706 into at least one specific SYNC frame in the sector data and insert a SYNC code created by the SYNC code insertion device 702 itself (or a prescribed SYNC code) into the other SYNC frames in the sector. Thus, the SYNC code insertion device 702 can selectively insert a SYNC code between the modulated codes.

The pickup 701 records the channel signal on the information recording medium 101. Such a recording operation is performed by, for example, converting the channel signal into a change in a physical characteristic of the information recording medium 101 (for example, a change in a reflectance).

The second encoder 706 can output a variation code, instead of the SYNC code, to the SYNC code insertion device 702. In this case, the second encoder 706 encodes the second data (additional data) and thus generates the variation code. The second data (additional data) can be encoded by an encoding method which corresponds to inverse conversion of the decoding method described in Examples 1 and 2.

The present invention provides an information recording apparatus for recording a SYNC code (or a variation code) obtained by encoding additional data on an information recording medium and thus embedding data which corresponds to the additional data in sector data or data in an ECC block.

EXAMPLE 5

Figure 8:
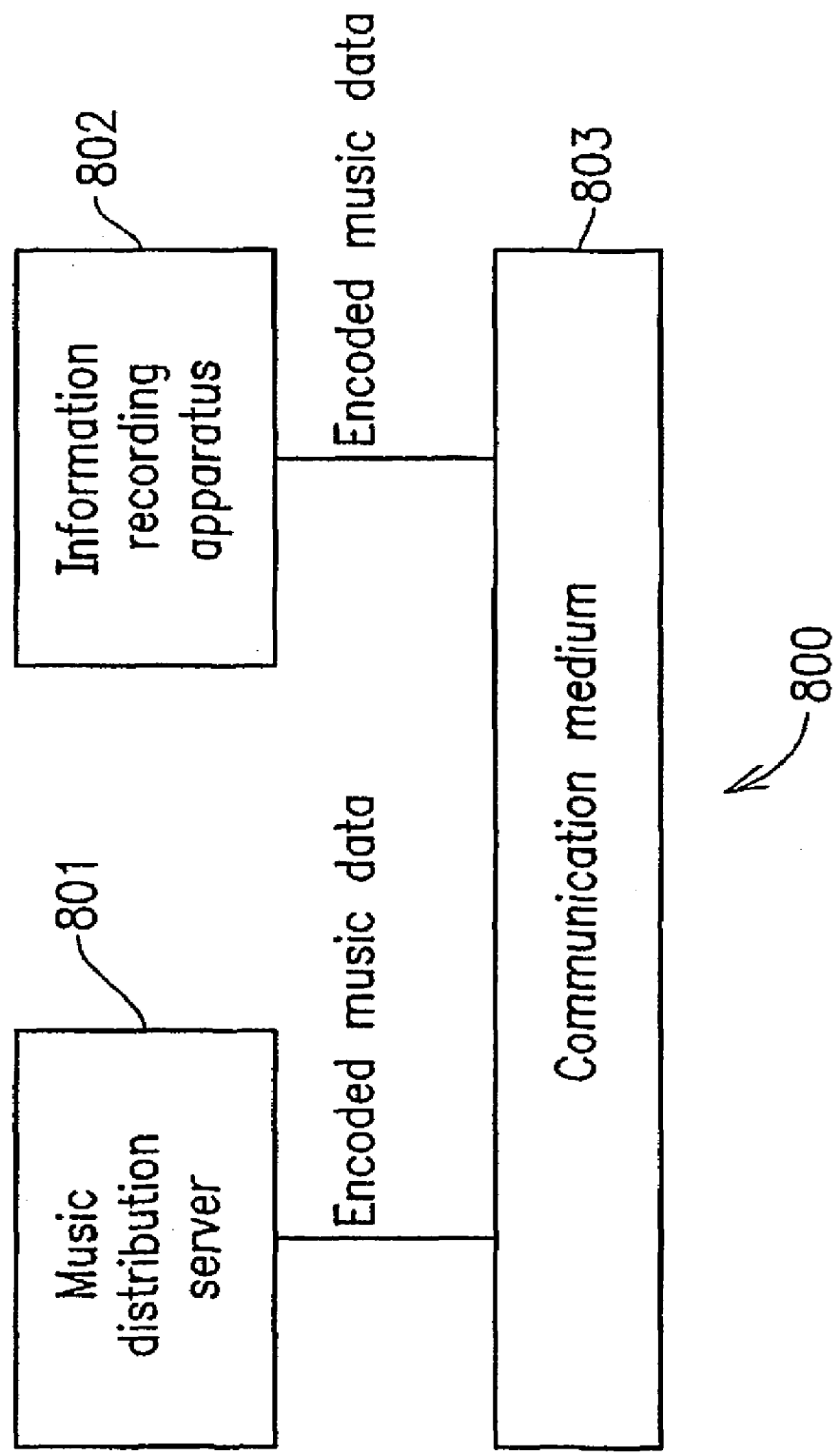
FIG. 8 shows an exemplary structure of a music distribution system 800 according to the present invention.

FIG. 8 shows a structure of a music distribution system 800 according to the present invention.

The music distribution system 800 includes a music distribution server 801 for sending encoded music data and an information recording apparatus 802 for receiving the encoded music data sent from the music distribution server 801 via a communication medium 803 and then recording the encoded music data on an information recording medium. FIG. 8 can be considered to show one exemplary circumstance in which the information recording apparatus 802 according to the present invention can be used.

Figure 9:
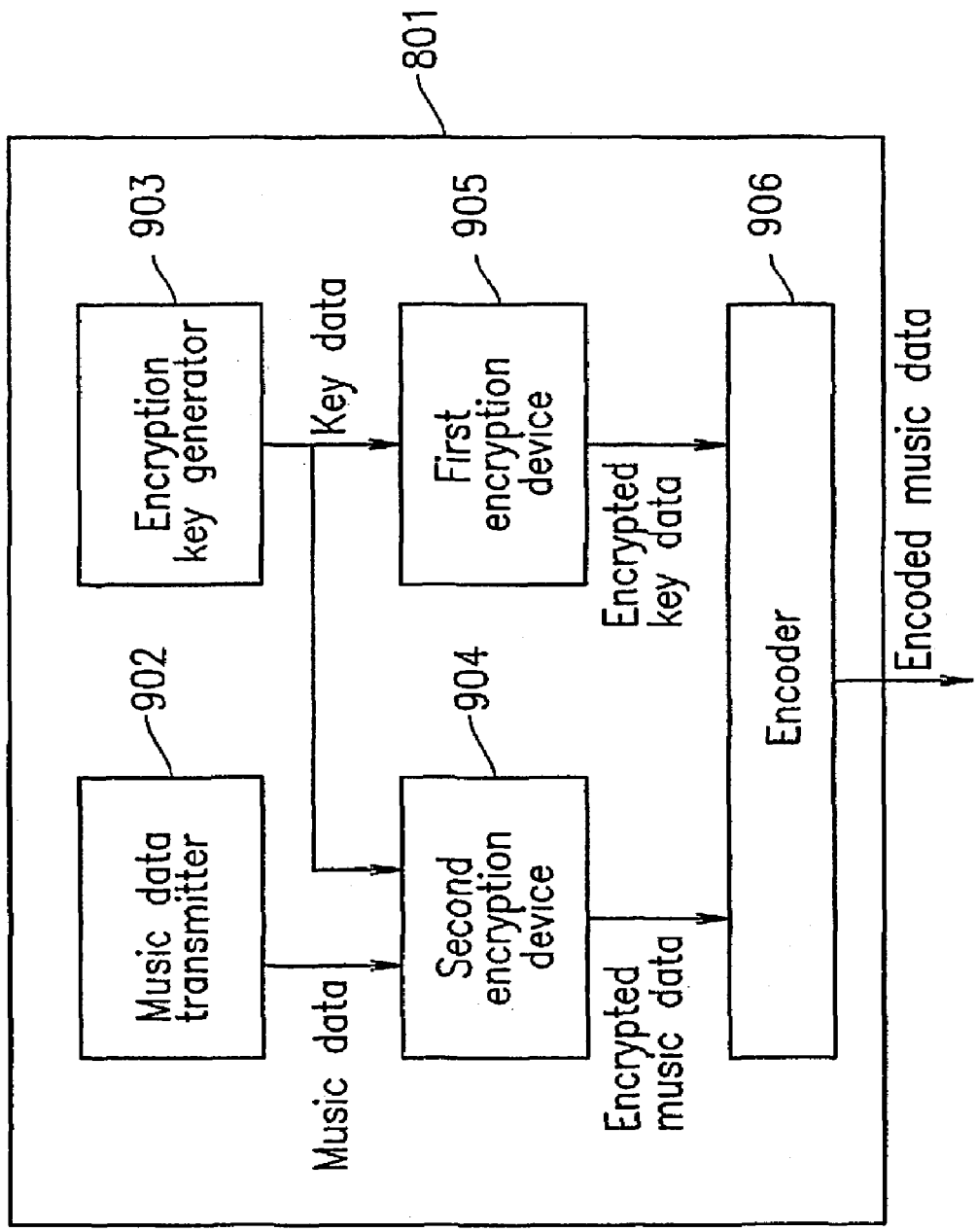
FIG. 9 shows an exemplary structure of a music distribution server 801 of the music distribution system 800 shown in FIG. 8.

FIG. 9 shows an exemplary structure of the music distribution server 801 shown in FIG. 8.

The music distribution server 801 includes a music data transmitter 902, an encryption key generator 903, a second encryption device 904, a first encryption device 905, and an encoder 906.

The music data transmitter 902 sends music data. The music data is not encrypted. The music data is sent to the second encryption device 904.

The encryption key generator 903 generates key data. The key data is not encrypted. The key data is output to the second encryption device 904 and the first encryption device 905.

The second encryption device 904 encrypts the music data sent from the music data transmitter 902 using the key data which is output from the encryption key generator 903. The encrypted music data is output to the encoder 906.

The first encryption device 905 encrypts the key data which is output from the encryption key generator 903. It is assumed here that an encryption method used by the first encryption device 905 is different from an encryption method used by the second encryption device 904. The encrypted key data is output to the encoder 906.

The encoder 906 encodes the encrypted music data and the encrypted key data, and thus generates encoded music data.

Figure 10:
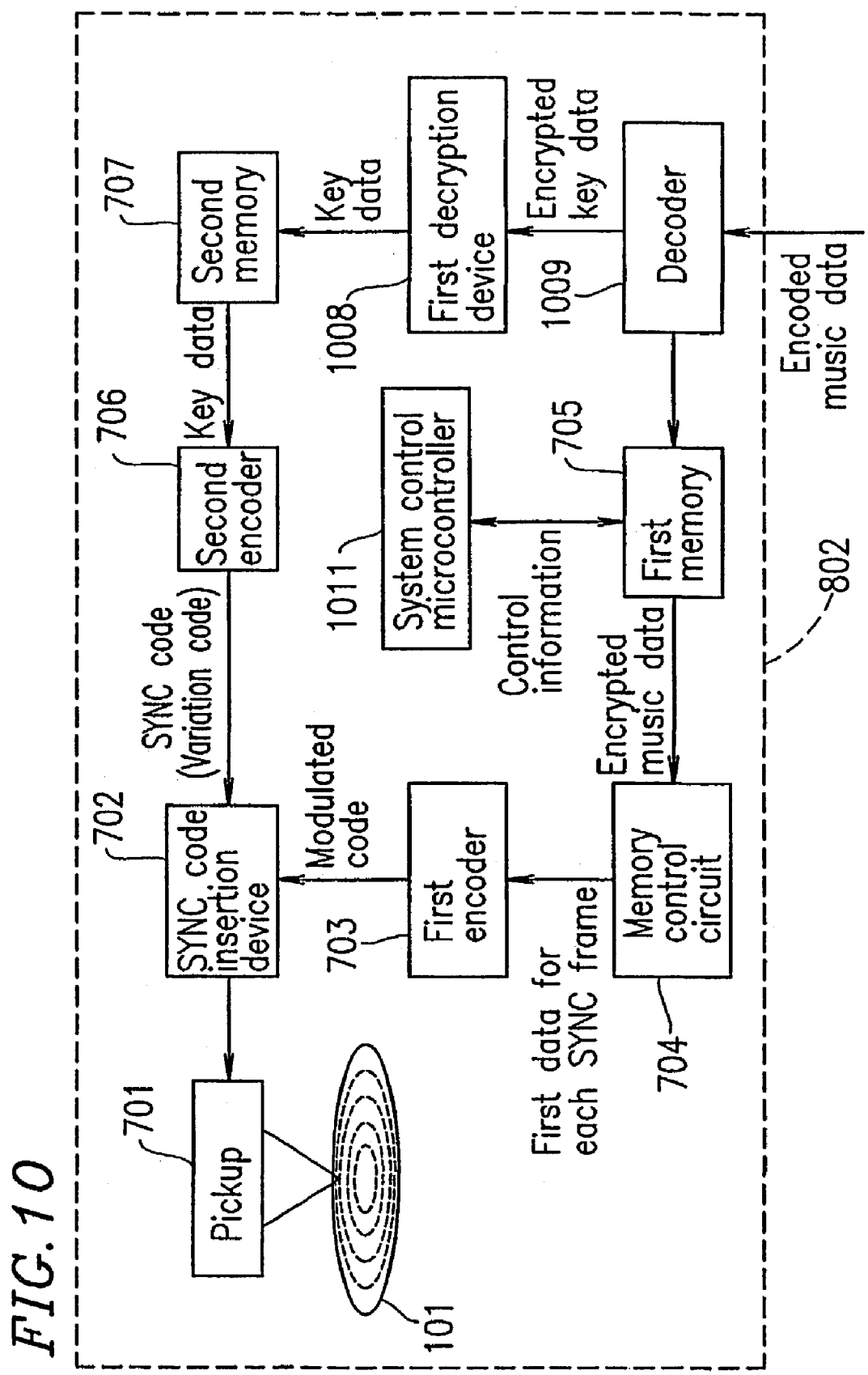
FIG. 10 shows an exemplary structure of an information recording apparatus 802 of the music distribution system 800 shown in FIG. 8.

FIG. 10 shows an exemplary structure of the information recording apparatus 802 shown in FIG. 8. In FIG. 10, identical elements to those described with reference to FIG. 7 will bear identical reference numerals therewith and description thereof will be omitted.

The information recording apparatus 802 includes a first decryption device 1008, a decoder 1009 and a system control microcontroller 1011 in addition to the elements shown in FIG. 7.

The decoder 1009 receives the encoded music data sent from the music distribution server 801 and decodes the encoded music data, and thus divides the encoded music data into encrypted music data and the encrypted key data. The encrypted music data is stored in the first memory 705. The encrypted key data is output to the first decryption device 1008.

The first decryption device 1008 decrypts the encrypted key data and thus outputs key data. The key data is stored in the second memory 707.

The system control microcontroller 1011 controls the entire information recording apparatus 802 in accordance with control information in the sector data or user inputs. The system control microcontroller 1011 is structured to be accessible to the first memory 705 but not to be accessible to the second memory 707, in order to prevent illegal accesses to the key data stored in the second memory 707.

Data obtained by encoding the encrypted music data stored in the first memory 705 and data obtained by encoding the key data stored in the second memory 707 are recorded on the information recording medium 101. The recording operation is similar to the recording operation described in Example 4 with reference to FIG. 7. The encrypted music data shown in FIG. 10 corresponds to the first data shown in FIG. 7. The key data shown in FIG. 10 corresponds to the second data (additional data) shown in FIG. 7.

The present invention provides an information recording apparatus for recording a SYNC code (or a variation code) obtained by encoding key data on an information recording medium and thus embedding data which corresponds to the key data in sector data or data in an ECC block.

In a conventional information recording apparatus, the key data and the encrypted music data are stored in the same memory (for example, the first memory). The system control microcontroller is structured to be accessible to the memory storing the encrypted music data. Therefore, there is an undesirable possibility that when a control program of the system control microcontroller is rewritten, the key data is illegally obtained or modified.

In the information recording apparatus 802 according to the present invention, the key data is stored in the second memory 707 which cannot be accessed by the system control microcontroller 1011. Therefore, the present invention provides an advantage that the key data is not illegally obtained or modified.

EXAMPLE 6

Figure 11:
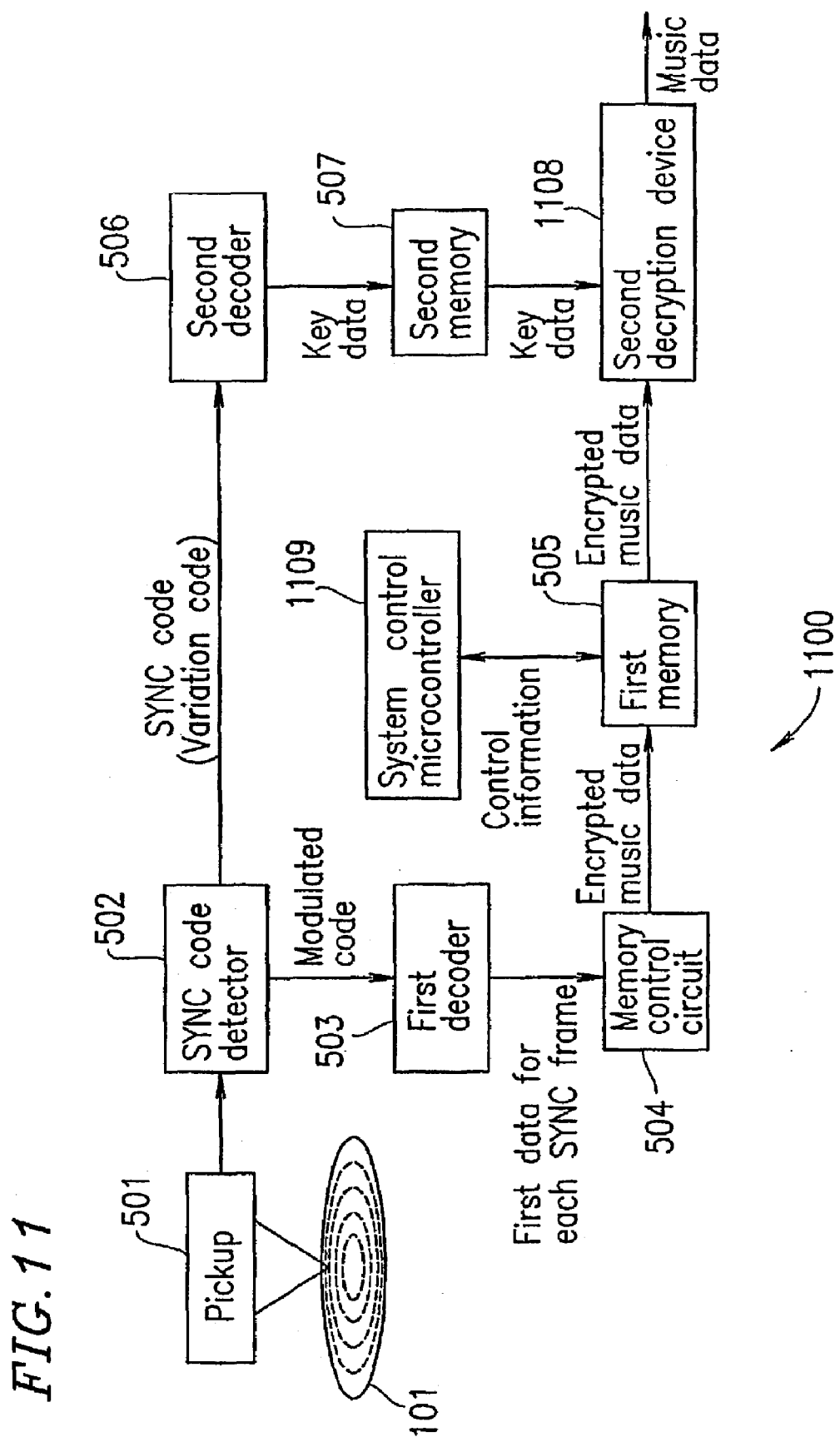
FIG. 11 shows an exemplary structure of an information reproduction apparatus 1100 according to the present invention.
Figure 12:
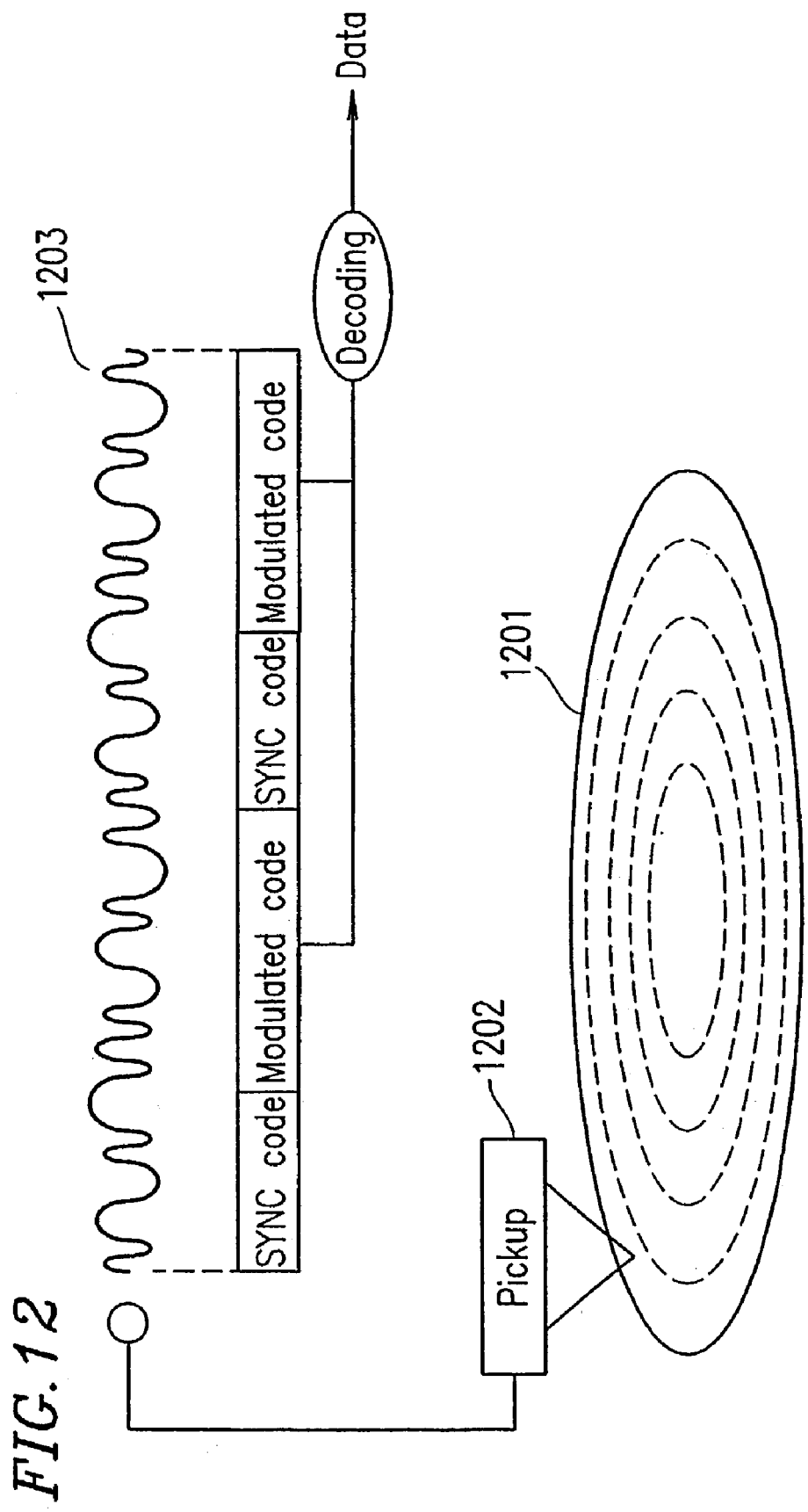
FIG. 12 shows a convention information recording medium 1201 and an example of a data structure of a channel signal 1203 which is recorded on the information recording medium 1201.
Figure 16:
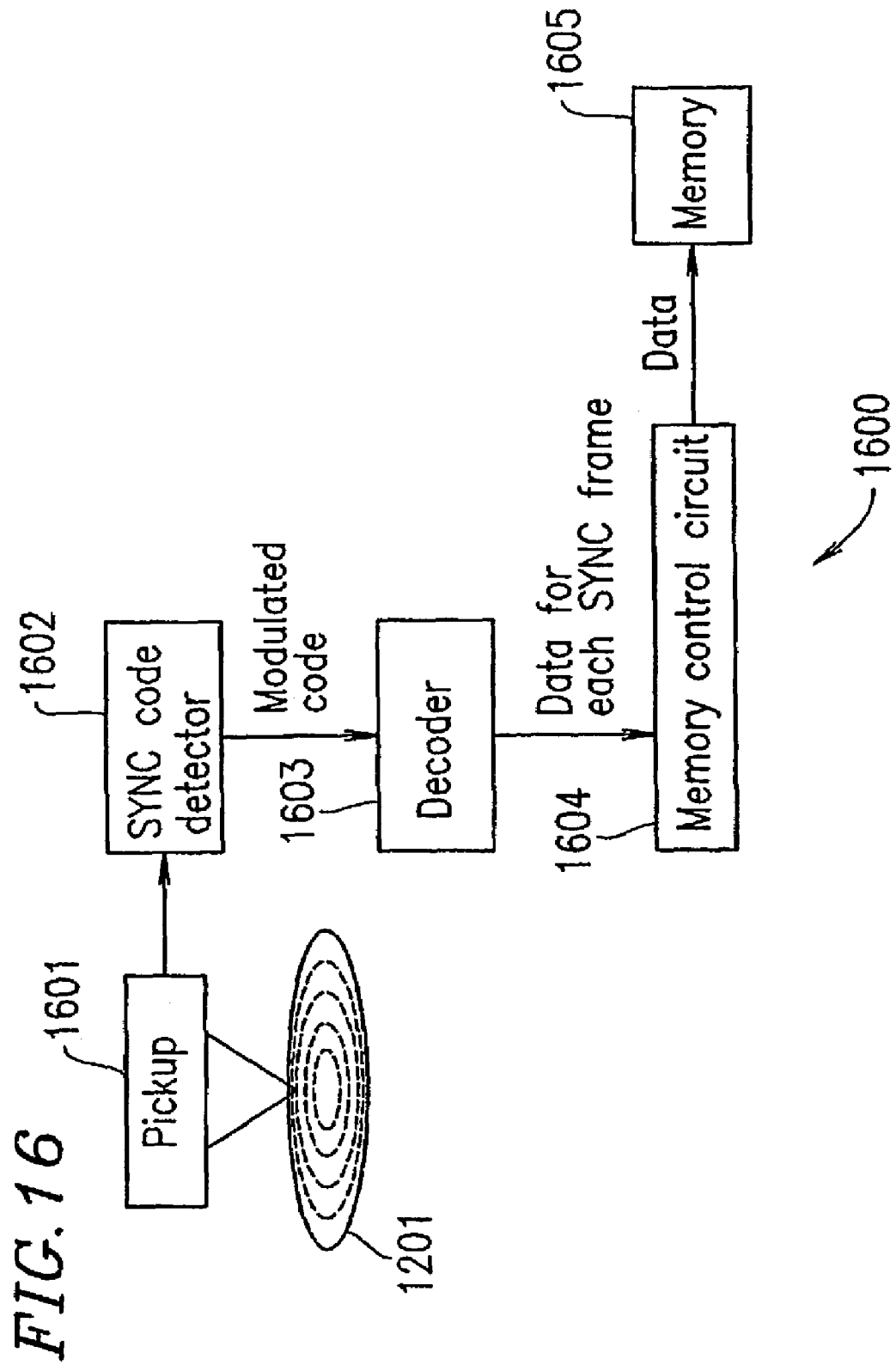
FIG. 16 shows an example of a structure of a conventional information reproduction apparatus 1600.
Figure 17:
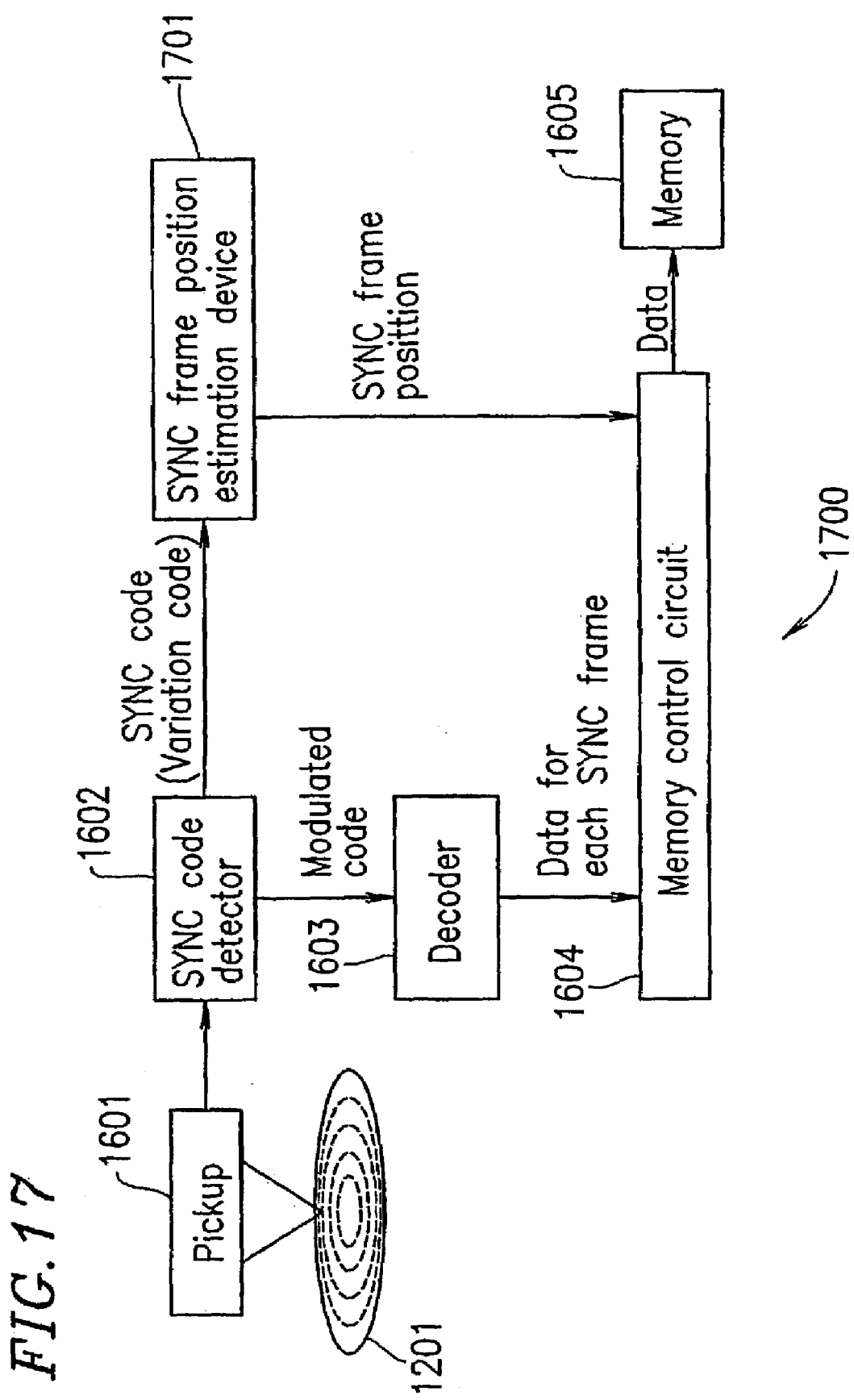
FIG. 17 shows an example of a structure of a conventional information reproduction apparatus 1700.

FIG. 11 shows a structure of an information reproduction apparatus 1100 according to the present invention. In FIG. 11, identical elements to those described with reference to FIG. 5 will bear identical reference numerals therewith and description thereof will be omitted.

The information reproduction apparatus 1100 includes a second decryption device 1108 and a system control microcontroller 1109 in addition to the elements shown in FIG. 5.

It is assumed that data obtained by encoding the encrypted music data and data obtained by encoding key data are recorded on the information recording medium 101. By reproducing the information recorded on the information recording medium 101, the encrypted music data is stored in the first memory 505 and the key data is stored in the second memory 507. The reproduction operation is similar to the reproduction operation described in Example 3 with reference to FIG. 5. The encrypted data shown in FIG. 11 corresponds to the first data shown in FIG. 5. The key data shown in FIG. 11 corresponds to the second data (additional data) shown in FIG. 5.

The second decryption device 1108 decrypts the encrypted music data stored in the first memory 505 using the key data stored in the second memory 507, and thus generates music data.

The system control microcontroller 1109 controls the entire information recording apparatus 1100 in accordance with control information in the sector data or user inputs. The system control microcontroller 1109 is structured to be accessible to the first memory 505 but not to be accessible to the second memory 507, in order to prevent illegal accesses to the key data stored in the second memory 507.

The present invention provides an information reproduction apparatus for decoding a SYNC code (or a variation code) recorded on an information recording medium thus generating key data.

In a conventional information reproduction apparatus, the key data and the encrypted music data are stored in the same memory (for example, the first memory). The system control microcontroller is structured to be accessible to the memory storing the encrypted music data. Therefore, there is an undesirable possibility that when a control program of the system control microcontroller is rewritten, the key data is illegally obtained or modified.

In the information reproduction apparatus 1100 according to the present invention, the key data is stored in the second memory 507 which cannot be accessed by the system control microcontroller 1109. Therefore, the present invention provides an advantage that the key data is not illegally obtained or modified.

INDUSTRIAL APPLICABILITY

The present invention provides an information recording medium for allowing data other than modulated code to be embedded in sector data without changing a data structure of the modulated code in the sector data.

The present invention provides an information recording medium for allowing data other than modulated code to be embedded in data in an ECC block without changing a data structure of the ECC block.

The present invention provides an information recording apparatus, an information recording method, an information reproduction apparatus and an information reproduction method for such an information recording medium.

The invention claimed is:

1. An information recording medium, comprising:
   a plurality of modulated data areas for recording a plurality of modulated codes; and
   a plurality of SYNC code areas for recording a plurality of SYNC codes,
   wherein each of the plurality of SYNC code areas includes an identification code area for recording an identification code for identifying the SYNC code, and a variation code area for recording a variation code for indicating a variation of the SYNC code, and
   data other than the plurality of modulated codes is recorded in at least one of the plurality of SYNC code areas in the form of at least one SYNC code.

2. An information recording medium according to claim 1, wherein the data is for protecting copyright of contents to be recorded in the information recording medium.

3. An information recording medium according to claim 1, wherein:
   the data is recorded in at least one of a plurality of variation code areas in the form of at least one variation code.

4. An information recording medium according to claim 1, wherein each of the plurality of SYNC codes is either one of SY0, SY1 and SY2; the SYNC code SY0 is recorded in the SYNC code area located at the head of a sector area for recording sector data; each of the SYNC codes SY1 and SY2 is recorded in the SYNC code area located at a position other than the head of the sector area; and the data is represented by a sequence including at least one of the SYNC codes SY1 and SY2.

5. An information recording medium according to claim 1, wherein each of the plurality of SYNC codes is either one of SY0 through SY7; the SYNC code SY0 is recorded in the SYNC code area located at the head of a sector area for recording sector data having a plurality of SYNC frames; each of the SYNC codes SY1 through SY7 is recorded in the SYNC code area located at a position other than the head of the sector area; and at least a part of the data is represented by a sequence of two SYNC codes respectively included in two predetermined successive SYNC frames among the plurality of SYNC frames.

6. An information recording medium according to claim 5, wherein the sequence of the two SYNC codes is one of (SY1, SY1), (SY1, SY2), (SY1, SY3), (SY1, SY4), (SY2, SY1), (SY2, SY2), (SY2, SY3), (SY2, SY4), (SY3, SY1), (SY3, SY2), (SY3, SY3), (SY3, SY4), (SY4, SY1), (SY4, SY2), (SY4, SY3), and (SY4, SY4).

7. An information recording apparatus for recording information on an information recording medium, the information recording medium including a plurality of modulated data areas for recording a plurality of modulated codes, and a plurality of SYNC code areas for recording a plurality of SYNC codes, wherein each of the plurality of SYNC code areas includes an identification code area for recording an identification code for identifying the SYNC code, and a variation code area for recording a variation code for indicating a variation of the SYNC code, and the information recording apparatus comprising:

an encoder for encoding additional data so as to generate data in the form of at least one SYNC code; and a recording section for recording the data in the form of the at least one SYNC code in at least one of the plurality of SYNC code areas.

8. An information recording method for recording information on an information recording medium, the information recording medium including a plurality of modulated data areas for recording a plurality of modulated codes, and a plurality of SYNC code areas for recording a plurality of SYNC codes, wherein each of the plurality of SYNC code areas includes an identification code area for recording an identification code for identifying the SYNC code, and a variation code area for recording a variation code for indicating a variation of the SYNC code, and the information recording method comprising the steps of:

encoding additional data so as to generate data in the form of at least one SYNC code; and recording the data in the form of the at least one SYNC code in at least one of the plurality of SYNC code areas.

9. An information reproduction apparatus for reproducing information recorded on an information recording medium, the information recording medium including a plurality of modulated data areas for recording a plurality of modulated codes, and a plurality of SYNC code areas for recording a plurality of SYNC codes, wherein each of the plurality of SYNC code areas includes an identification code area for recording an identification code for identifying the SYNC code, and a variation code area for recording a variation code for indicating a variation of the SYNC code, and data obtained by encoding additional data is recorded in at least one of the plurality of SYNC code areas in the form of at least one SYNC code, the information reproduction apparatus comprising:

a SYNC code detector for detecting the data recorded in the at least one of the plurality of SYNC code areas in the form of the at least one SYNC code; and a decoder for decoding the detected data in the form of the at least one SYNC code so as to generate the additional data.

10. An information reproduction method for reproducing information recorded on an information recording medium, the information recording medium including a plurality of modulated data areas for recording a plurality of modulated codes, and a plurality of SYNC code areas for recording a plurality of SYNC codes, wherein each of the plurality of SYNC code areas includes an identification code area for recording an identification code for identifying the SYNC code, and a variation code area for recording a variation code for indicating a variation of the SYNC code, and data obtained by encoding additional data is recorded in at least one of the plurality of SYNC code areas in the form of at least one SYNC code, the information reproduction method comprising the steps of:

detecting the data recorded in the at least one of the plurality of SYNC code areas in the form of the at least one SYNC code; and decoding the detected data in the form of the at least one SYNC code so as to generate the additional data.

* * * * *